United States Patent
Poisner et al.

(10) Patent No.: US 9,692,756 B2
(45) Date of Patent: Jun. 27, 2017

(54) MAGIC WAND METHODS, APPARATUSES AND SYSTEMS FOR AUTHENTICATING A USER OF A WAND

(71) Applicant: Intel Corporation, Santa Clara, CA (US)

(72) Inventors: David I. Poisner, Carmichael, CA (US); Gregory A. Peek, North Plains, OR (US); Blanka Vlasak, Beaverton, OR (US); Yevgeniy Y. Yarmosh, Portland, OR (US); Mark R. Francis, Portland, OR (US); Ravishankar Iyer, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 79 days.

(21) Appl. No.: 14/864,572

(22) Filed: Sep. 24, 2015

(65) Prior Publication Data
US 2017/0093848 A1    Mar. 30, 2017

(51) Int. Cl.
*H04L 29/06* (2006.01)
(52) U.S. Cl.
CPC .......... *H04L 63/0861* (2013.01); *H04L 63/10* (2013.01)
(58) Field of Classification Search
CPC .................................................. H04L 64/3861
USPC ............................................................ 726/4
See application file for complete search history.

(56) References Cited

U.S. PATENT DOCUMENTS

| | | | |
|---|---|---|---|
| 7,076,767 B1 | 7/2006 | Williams | |
| 7,500,917 B2 | 3/2009 | Barney et al. | |
| 7,896,742 B2 | 3/2011 | Weston et al. | |
| 2002/0058459 A1 | 5/2002 | Holt | |
| 2003/0069077 A1 | 4/2003 | Korienek | |
| 2006/0046606 A1 | 3/2006 | Martin et al. | |
| 2007/0066395 A1 | 3/2007 | Harris et al. | |
| 2008/0009345 A1 | 1/2008 | Bailey et al. | |

(Continued)

FOREIGN PATENT DOCUMENTS

WO    2014185861 A1    11/2014

OTHER PUBLICATIONS

International Search Report and Written Opinion mailed Dec. 22, 2016, for International Application No. PCT/US2016/048216, 13 pages.

(Continued)

*Primary Examiner* — Longbit Chai
(74) *Attorney, Agent, or Firm* — Schwabe, Williamson & Wyatt, P.C.

(57) ABSTRACT

Methods, apparatuses, systems, and storage media for creating, discovering, and/or resolving spells using a wand are provided. In embodiments, a computing device or a wand may detect one or more gestures and sensors in the wand may generate sensor data representative of the one or more gestures. The one or more gestures may be movements performed using the wand. The sensor data representative of the one or more gestures may be converted into a spell sequence. The wand may transmit the spell sequence to a computing device, and receive, from the computing device, an authentication spell output when the spell sequence corresponds with an authentication spell sequence or an inactivation spell output when the spell sequence does not correspond with the authentication spell sequence. Other embodiments may be described and/or claimed.

25 Claims, 11 Drawing Sheets

(56) References Cited

U.S. PATENT DOCUMENTS

| | | | |
|---|---|---|---|
| 2008/0039204 A1 | 2/2008 | Ackley et al. | |
| 2008/0238937 A1 | 10/2008 | Muraki | |
| 2009/0083847 A1 | 3/2009 | Fadell et al. | |
| 2009/0191968 A1 | 7/2009 | Johnson et al. | |
| 2012/0178529 A1 | 7/2012 | Collard et al. | |
| 2013/0010207 A1 | 1/2013 | Valik et al. | |
| 2013/0084979 A1 | 4/2013 | Casino et al. | |
| 2014/0235341 A1 | 8/2014 | Barney et al. | |
| 2015/0099585 A1* | 4/2015 | Barney | G06F 3/0487 463/39 |

OTHER PUBLICATIONS

International Search Report and Written Opinion mailed Dec. 27, 2016, for International Application No. PCT/US2016/048488, 19 pages.

International Search Report and Written Opinion mailed Nov. 30, 2016, for International Application No. PCT/PCT/US2016/048481, 18 pages.

Non-Final Office action mailed Jan. 11, 2017, issued in corresponding U.S. Appl. No. 14/697,343, 39 pages.

International Search Report and Written Opinion mailed Jun. 22, 2016 for International Application No. PCT/US2016/021365, 18 pages.

Kymera Magic Wand Library—Kymera Wand Manual, http://www.kymera-wand.com/kymera-wand-manua, 15 pages, Apr. 29, 2015.

Mark Ladd, "LyteShot: A Sensor-Based Mobile Gaming Platform (Canceled)—Kickstarter", https://www.kickstarter.com/projects/1450125572/lyteshot-a-sensor-based-mobile-gaming-platform, 16 pages, Apr. 29, 2015.

Lyteshot Main Page and Developers Page, http://lyteshot.com, 8 pages, May 4, 2015.

Harry Potter Control Want at noblecollection.com, http://www.noblecollection.com/Item-i.PRP-HP-8050, 1 page, May 5, 2015.

Harry Potter Remote Control Wand, http://www.wbshop.com/product/harry+potter+remote+control+wand+hpnbwandlurc.do, 4 pages, May 5, 2015.

Office Action mailed May 11, 2017 for U.S. Appl. No. 14/697,343, 40 pages.

* cited by examiner

MAGIC WAND METHODS, APPARATUSES AND SYSTEMS FOR AUTHENTICATING A USER OF A WAND

RELATED APPLICATIONS

This application is related to U.S. application Ser. No. 14/697,343 filed on Apr. 27, 2015 entitled "MAGIC WAND METHODS, APPARATUSES AND SYSTEMS."

FIELD

The present disclosure relates to the field of interactive computing, and in particular, to apparatuses, methods, storage media, and systems utilizing a wand in interactive games.

BACKGROUND

Entertainment systems, video game consoles, and/or other like gaming devices typically provide interactive gaming experiences wherein users interact with a game and/or other users by providing one or more inputs and receiving feedback in response to the provided inputs. The inputs may be provided using an input device or controller, such as joysticks, keyboards, computer mice, touchscreens, motion sensing devices, and the like. The feedback may be received using one or more output devices, such as through display devices, audio devices, haptic feedback devices, and the like.

Gaming devices and their controllers may provide some interactive gaming experiences. However, many of these gaming devices are limited to proprietary platforms, which often require the use of platform-specific controllers. The term "platform" may refer to the specific electronic components and software that provide a gaming experience. Furthermore, many of these gaming devices and gaming experiences may be limited to specific physical and/or virtual environments. Moreover, many of these gaming devices do not provide users with the ability to interact with other devices, such as non-proprietary gaming devices and/or non-gaming devices. Therefore, typical gaming devices and/or platforms may be limited in their ability to offer an immersive gaming experience.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

DETAILED DESCRIPTION

Figure 1:
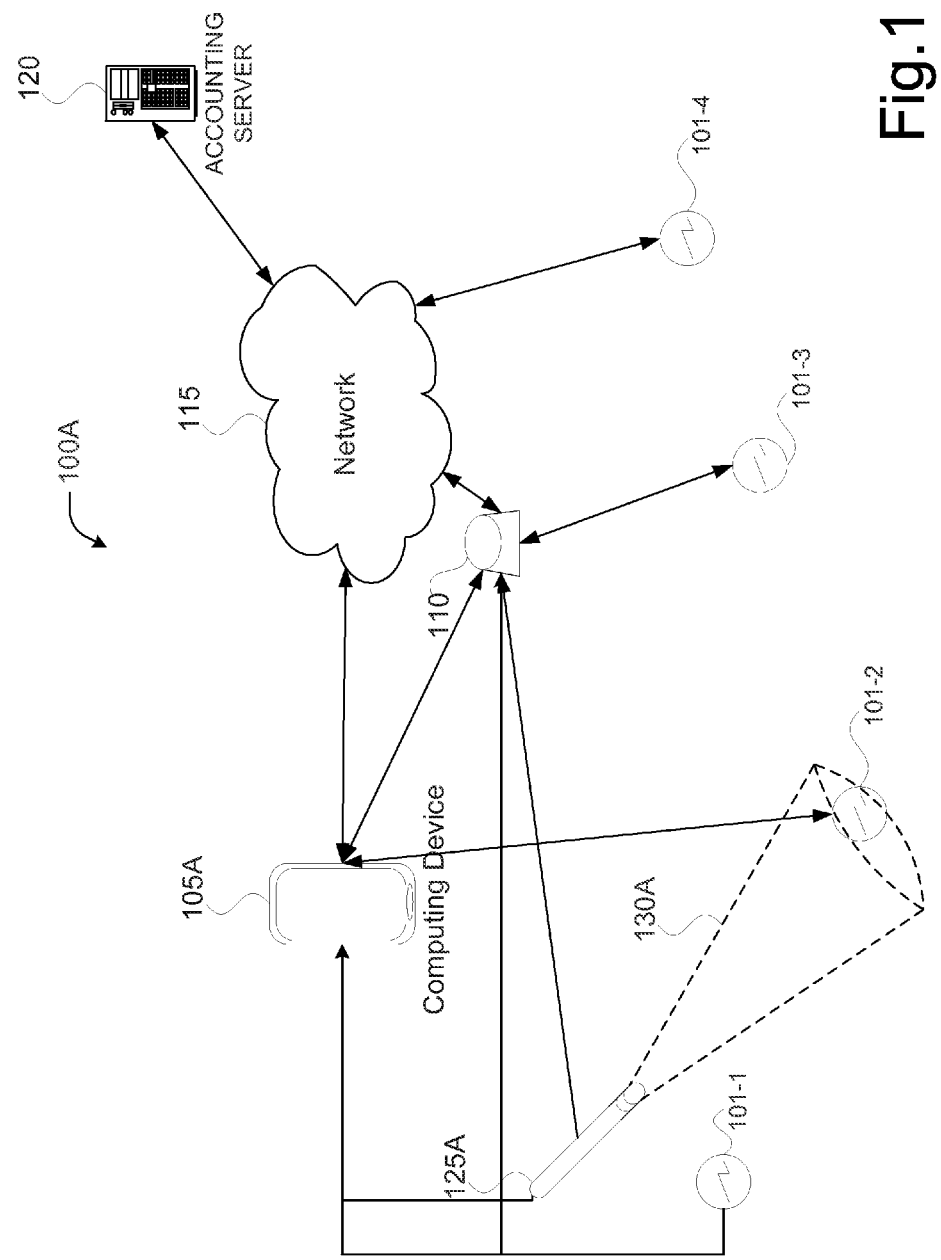
FIGS. 1-4 illustrate various gaming environments in which various example embodiments described in the present disclosure may be implemented.

In the following detailed description, reference is made to the accompanying drawings which form a part hereof wherein like numerals designate like parts throughout, and in which is shown by way of illustrated embodiments that may be practiced. It is to be understood that other embodiments may be utilized and structural and/or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions and/or operations in turn, in a manner that is most helpful in understanding the claimed subject matter. However, the order of description should not be construed to imply that the various operations are necessarily order dependent. In particular, these operations may not be performed in the order of presentation. Operations described may be performed in a different order than the described embodiments. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C). For the purposes of the present disclosure, the phrase "at least one of A and B" means (A), (B), or (A and B).

The description may use the phrases "in an embodiment", or "in embodiments", which may each refer to one or more of the same or different embodiments. Furthermore, the terms "comprising," "including," "having," and the like, as used with respect to embodiments of the present disclosure, are synonymous.

As used herein, the term "logic", "module", and/or "circuitry" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality. In some embodiments, the modules and/or circuitry may be implemented in, or functions associated with the modules and/or circuitry may be implemented by, one or more software or firmware modules in combination with one or more hardware devices.

Also, it is noted that example embodiments may be described as a process depicted as a flowchart, a flow diagram, a data flow diagram, a structure diagram, or a block diagram. Although a flowchart may describe the operations as a sequential process, many of the operations may be performed in parallel, concurrently, or simultaneously. In addition, the order of the operations may be re-arranged. A process may be terminated when its operations are completed, but may also have additional steps not included in the figure(s). A process may correspond to a method, a function, a procedure, a subroutine, a subprogram, and the like. When a process corresponds to a function, its termination may correspond to a return of the function to the calling function and/or the main function.

As disclosed herein, the term "memory" may represent one or more hardware devices for storing data, including random access memory (RAM), magnetic RAM, core memory, read only memory (ROM), magnetic disk storage mediums, optical storage mediums, flash memory devices and/or other machine readable mediums for storing data. The term "computer-readable medium" may include, but is not limited to, memory, portable or fixed storage devices, optical storage devices, wireless channels, and various other mediums capable of storing, containing or carrying instruction(s) and/or data.

Furthermore, example embodiments may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium. A code segment may represent a procedure, a function, a subprogram, a program, a routine, a subroutine, a module, program code, a software package, a class, or any combination of instructions, data structures, program statements, and the like.

As used herein, the term "computing device" may be considered synonymous to, and may hereafter be occasionally referred to, as a client, client device, mobile, mobile unit, mobile device, mobile terminal, mobile station, mobile user, user equipment (UE), user terminal, subscriber, user, remote station, access agent, user agent, receiver, etc., and may describe a remote user of network resources in a communications network. Furthermore, the term "computing device" may include any type of wired and/or wireless device such as consumer electronics devices, desktop personal computers (PCs), laptop PCs, smart phones, tablet PCs, wearable computing devices, personal digital assistants (PDAs), and/or any other like physical computing device that is able to connect to a communications network.

As used herein, the term "network element", may be considered synonymous to and/or referred to as a networked computer, networking hardware, network equipment, router, switch, hub, bridge, gateway, and/or other like device. The term "network element" may describe a physical computing device of a wired or wireless communication network that is configured to host a client device and the like. Furthermore, the term "network element" may describe equipment that provides radio baseband functions for data and/or voice connectivity between a network and one or more users.

As used herein, the term "game" may considered synonymous to and/or referred to as a quest, sport, event, activity, role-playing games (RPG), simulation, duel, etc. A game may be any sequence of events with or without a defined set of rules, wherein the sequence of events and/or rules may be defined by a game operator, game creator, and/or other like entity. Typically games have a beginning and a conclusion, but in some embodiments, a game may not have either a beginning or an ending.

Example embodiments disclosed herein provide apparatuses, systems, and methods for providing immersive interactive gaming experiences. Example embodiments introduce a "magic" wand that may be used for interacting with a game or immersing oneself within a gaming environment. Example embodiments also utilize already existing output devices and/or already existing gaming platforms to provide gaming feedback to a user. The example embodiments differ from typical gaming platforms or systems that provide interactive gaming experiences because the typical gaming platforms are usually tied to a specific proprietary platform, and/or tied to a specific physical or virtual environment. For example, video game platforms require proprietary video game consoles, which often require proprietary video game controllers, video game motion detectors, and video game software to run on the video game console. Additionally, most video game platforms do not provide for interoperability with or between competing platforms. By way of another example, laser tag, which is a recreational activity where players attempt to score points by tagging targets, typically requires a hand-held infrared (IR)-emitting targeting device to be used within a defined physical environment, such as an indoor or outdoor arena. Many laser tag systems use IR-sensitive targets are commonly worn by each player and may be integrated within the arena in which the game is played, which may allow laser tag participants to interact with one another and their defined environment. However, typical laser tag systems are limited to their specific physical environment and usually require users to employ the same or similar IR-emitting targeting devices. Additionally, although many laser tag systems and devices use hardware and embedded software to alter game parameters and/or provided varied game play, these typical laser tag systems usually only provide a single method for tagging targets, such as by pulling a trigger on a laser tag gun. Moreover, most gaming systems or platforms do not typically include methods and/or apparatuses for authenticating handheld input and/or output devices.

Example embodiments discussed herein provide methods, apparatuses, and systems for authenticating a user of a wand, such that the user may perform one or more gestures using the wand, and the wand or an associated computing device may determine the user's identity. Example embodiments also provide methods, apparatuses, and systems for allowing a user to define an authentication spell, wherein the user may perform one or more gestures to be used for authenticating the user's identity.

The example embodiments disclosed herein refer to a user interface device/controller as a "wand", which may refer to the general shape and/or form of the user interface device. However, it should be noted that the term "wand" is not meant to limit the user interface device disclosed herein to a specific shape or form. Indeed, other forms, shapes, and/or artistic representations of the user interface device may be used. For example, the user interface device may be shaped, formed, or otherwise implemented as a scepter, a staff, a baton, a rod, a pen, a sword, a sabre, a screwdriver, a glove, a ring, a bracelet, stuffed or plush toy, a baseball bat, a lacrosse stick, and/or any other like device that may impart directionality. Furthermore, the example embodiments disclosed herein refer to the environment in which the wand or user interface device is used as a "gaming environment" or "environment". It should be noted that the user interface devices disclosed herein may be used for various activities other than games. For example, the user interface device may be implemented in toy guns, training guns, and the like for use in police and/or military training environments, such as urban operations (UO) exercises, military operations in urban terrain (MOUT) exercises, and the like. By way of another example, the user interface device may be implemented in a wearable device for use in commercial environments, such as a shopping mall, a city's downtown region, or specific shops/stores. Moreover, the user interface device described herein may be used for home automation, such as controlling one or more services associated with one or more smart objects or IoT devices.

In various embodiments, the wand is a user interface that allows a user to initiate specific "spells", which, according to various embodiments, may be triggers to one or more sequences, operations, and/or actions by internal feedback/output devices and/or external feedback/output devices. For example, a user may perform an "unlock" spell by manipulating a wand using various motions and/or gestures, which may be converted into a spell sequence. The spell sequence may then be used to determine that a smart lock is to unlocked, and state-change instructions (or "unlock" instructions in this example) may be sent to the smart lock. In various embodiments, the wand may use one or more built-in or associated sensors to collect data about an intended spell, spell direction, and/or spell intensity. In various embodiments, the collected data may include spatial coordinates of the wand and/or changes in the spatial coordinates captured by the one or more sensors, position information of the wand relative to one or more external devices (including other wands), and/or voice commands issued by a user of the wand. Examples of the one or more sensors include accelerometers, gyroscopes, magnetometers, gravimeters, temperature sensors, pressure sensors, humidity sensors, electromagnetic energy (ultraviolet, visible light, IR, etc.) sensors, GPS sensors, microphones, and the like. In various embodiments, the wand may also include a communications module, transmission circuitry, and/or other means of device communications so that the wand may communicate the collected sensor data to a computing device, a gaming system, external output/feedback devices, and the like. The communications between the wand and the other devices may be by way of radio-frequency (RF) communications methods, such as Bluetooth low energy (BLE) signaling, RF identification (RFID) signaling, IR signaling, WiFi signaling, and the like. In some embodiments, the wand may send the data to an application running on a paired computing device, such as a smartphone, a desktop PC, a home/arena server, or any other like dedicated device. The computing device, by way of the application, may analyze the data, determine the spell type, spell direction, and/or spell intensity. The computing device, by way of the application, may then communicate with, or otherwise instruct one or more feedback/output devices in the vicinity of the wand and/or computing device to activate in accordance with the determined spell. Furthermore, the computing device may also send information indicative of the determined spell to a game accounting server or other like back-end service to track a user's progress in an interactive game and/or quest. In some embodiments, the computing device may include the capabilities and/or functions of the back-end service. In some embodiments, the wand itself may include the capabilities and/or functions of the computing device, such that the wand itself may determine the spell type, spell direction, and spell intensity and instruct one or more feedback/output devices in the vicinity of the wand to activate in accordance with the determined spell. In various embodiments, the electronic components and software components of the wand may be housed in a "wand module", which can be inserted in a larger housing, which may allow for a variety of artistic representations of the "wand". For example, the housing could be a hand-held device that is depicted in various movies, television series, books, etc.

Figure 2:
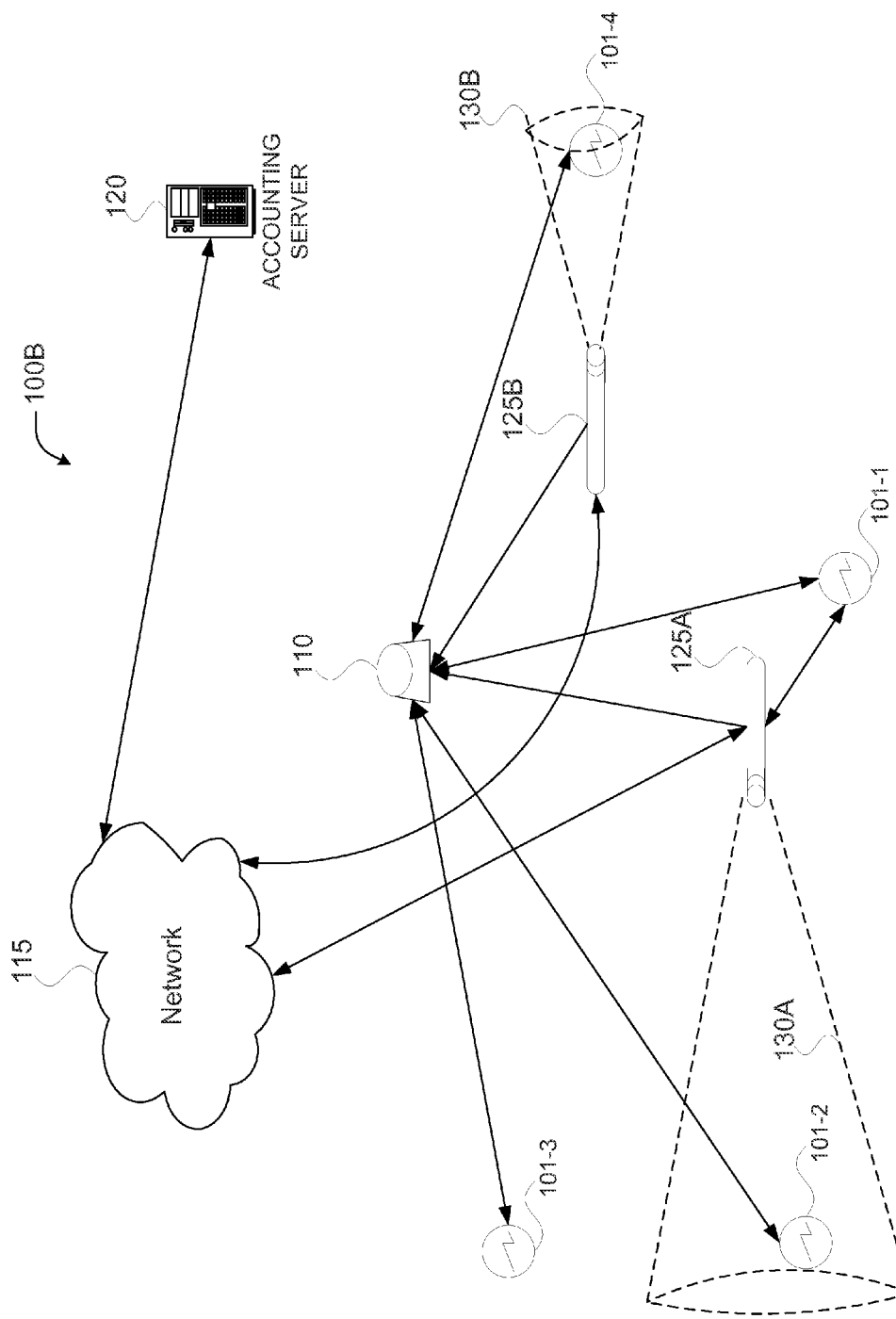
Figure 3:
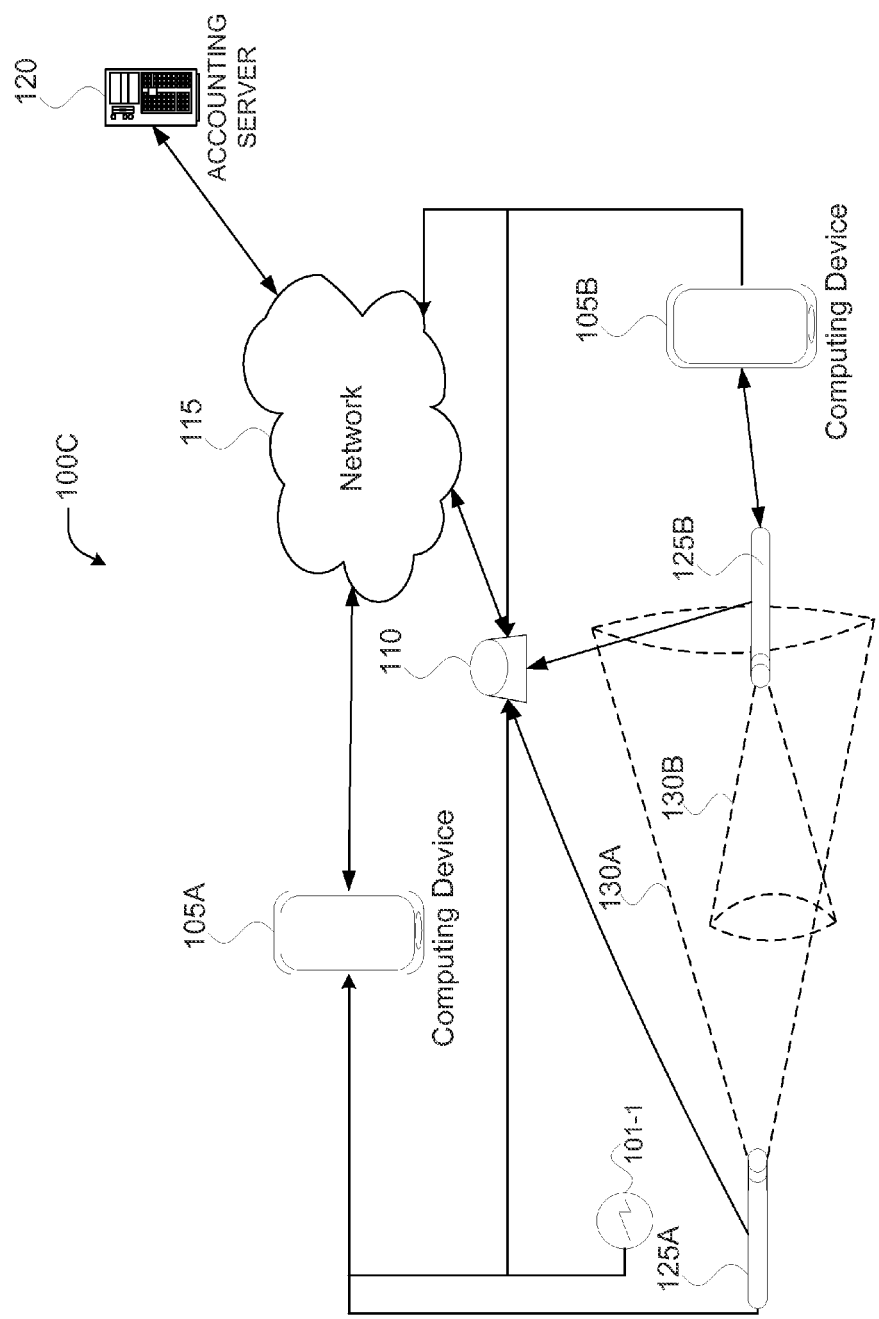

Referring now to the figures. FIGS. 1-3 show gaming environments 100A, 100B, and 100C (collectively referred to as "gaming environment 100"), respectively, in which a wand 125 may be used to activate one or more devices 101-1 to 101-4, in accordance with various embodiments. As shown in FIGS. 1-3, gaming environment 100 may include devices 101-1 to 101-4 (collectively referred to as "devices 101"), computing devices 105A and 105B (collectively referred to as "computing devices 105" or "computing device 105"), beacon 110, network 115, accounting server 120, and wand 125A and 125B (collectively referred to as "wand 125"). FIG. 1 illustrates an example embodiment of a single player gaming environment 100A in which the wand 125A is coupled with computing device 105A; FIG. 2 illustrates an example embodiment of a multiplayer gaming environment 100B in which the wand 125A and 125B operate without coupled computing devices 105A and 105B; and FIG. 3 illustrates an example embodiment of a multi-player gaming environment 100C in which a "wand duel" takes place between wand 125A and 125B coupled with computing devices 105A and 105B, respectively.

Figure 6:
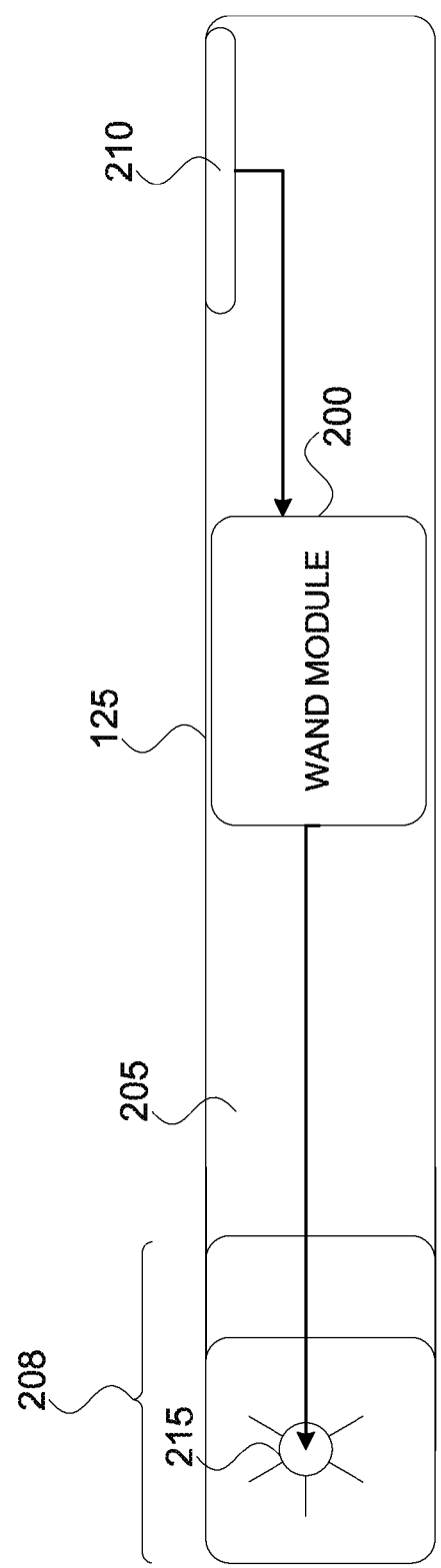
FIG. 6 illustrates the components of a wand, in accordance with various example embodiments.
Figure 7:
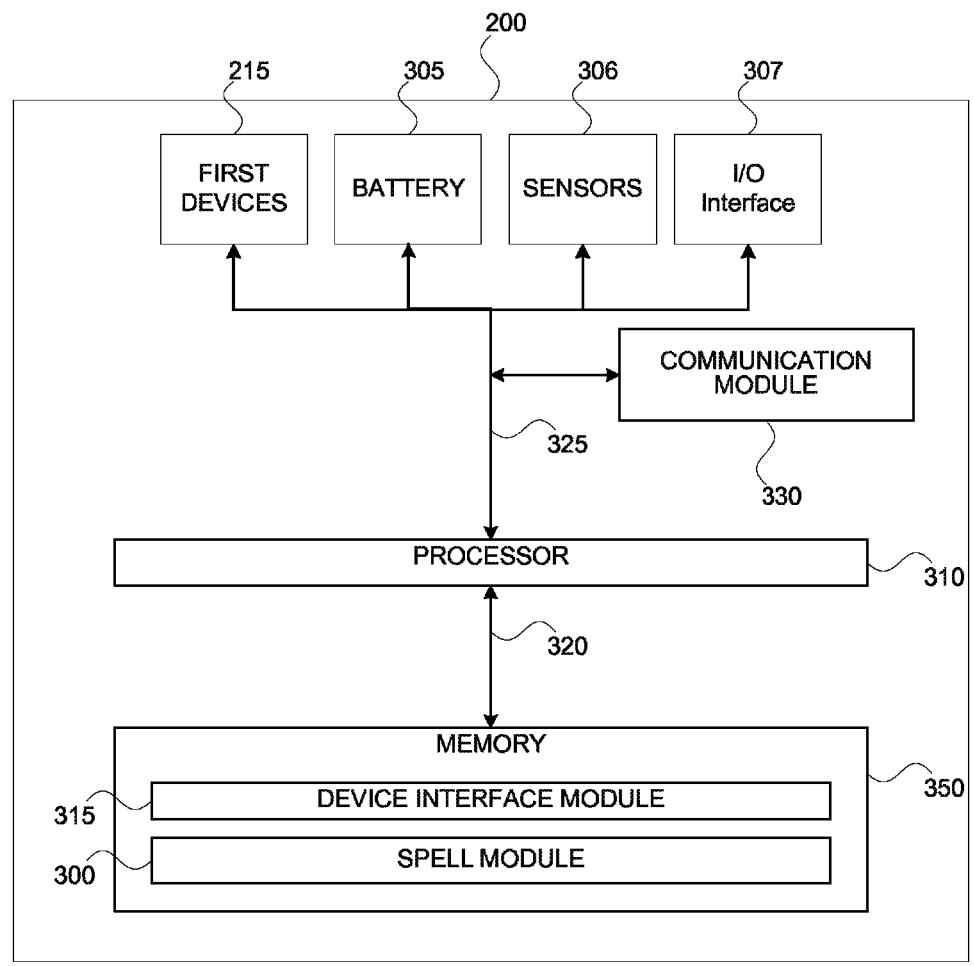
FIG. 7 illustrates the components of a wand module, in accordance with various example embodiments.
Figure 9:
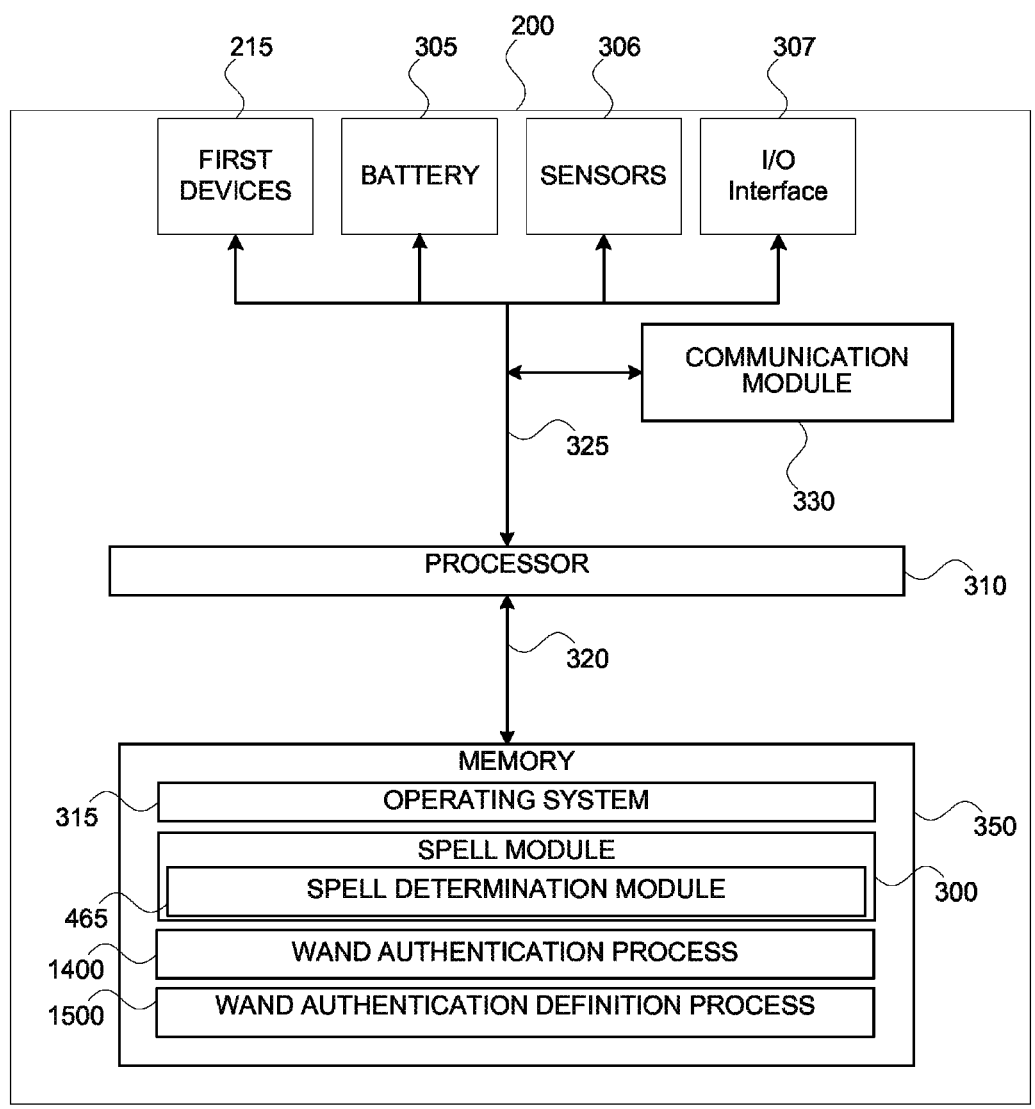
FIG. 9 illustrates the components of a wand module, in accordance with various example embodiments.

According to various embodiments, wand 125 may be any handheld device that provides a user with the ability to interact with one or more devices in the gaming environment 100, such as devices 101 and/or computing devices 105. The wand 125 may include a communication module (e.g., communications module 330 as shown in FIGS. 7 and 9), one or more memory devices (e.g., memory 350 as shown in FIGS. 7 and 9), one or more processors (e.g., processor 310 as shown in FIGS. 7 and 9), one or more sensors (e.g., sensors 306 as shown in FIGS. 7 and 9), one or more output/feedback devices (e.g., first devices 215 as shown in FIGS. 6, 7, and 9), and/or other like components (e.g., as shown in FIGS. 7 and 9). Wand 125 may be designed to sequentially and automatically carry out a sequence of arithmetic or logical operations; equipped to record/store digital data on a machine readable medium; and transmit and receive digital data.

Wand 125 may include one or more sensors, such as an accelerometer, gyroscope, gravimeter, magnetometer, and/or another like devices that are configured to measure and/or detect a motion, an acceleration, and/or an orientation of the wand 125. In such embodiments, wand 125 may be configured to determine a magnitude and direction of an acceleration and/or motion of the wand 125, and convert the acceleration and/or motion of the wand 125 into position and/or orientation information. The changes in the positions and/or orientations of the wand 125 may be indicative of one or more gestures performed by a user of the wand 125. The one or more sensors may be configured to detect the one or more gestures as sensor data. In various embodiments, the sensor data may include or otherwise indicate one or more spatial coordinates (or changes in spatial coordinates) for the positions and/or orientations of the wand 125. The sensor data may then be passed to a processor and/or spell module of the wand 125 to be converted into a spell sequence, or for any other type of analysis and/or filtering. In this way, the positions and/or orientations (or changes in the positions and/or orientations) may be used to determine a spell type, spell direction, spell intensity, etc. according to the various example embodiments described herein. In some embodiments, the one or more sensors may include a microphone configured to obtain one or more voice commands issued by a user of the wand 125. In such embodiments, the one or more voice commands may be recorded and included with the spell sequence for spell determination. In some embodiments, the one or more sensors may include one or more biometric sensors, such as an infrared heart rate monitoring device, a fingerprint or handprint scanning device, an eye scanning device, an electromyography (EMG) device for detecting electrical patterns associated with a user's muscular contractions, an electroencephalograph (EEG) device for measuring and/or recording electrical signals produced by a user's brain, and the like. In such embodiments, biometric data detected or sensed by the one or more biometric sensors may be included with the spell sequence for spell determination, such that the user's heart rate, finger/hand print, muscular contractions, brainwaves, and the like may be included with the spell sequence for spell determination.

Furthermore, in various embodiments, the wand 125 may track timing information associated with one or more performed gestures. Such timing information may be a time period in which the one or more gestures are required to be performed (within a certain margin of error) and/or a time period in which each of the one or more gestures are to be performed. For instance, a spell may require specific sequences or timing relationships in order to obtain a spell output. For example, a spell might require a button press followed by a bodily movement, followed by a voice command, etc., wherein all of the aforementioned gestures are required to be performed within a 30 second period of time. By way of another example, a spell may require that a bodily movement and a voice command start and complete within 200 milliseconds of each other.

In some embodiments, the one or more sensors may include one or more motion capture devices that may be configured to capture motion by detecting a change in position of a body relative to its surroundings, or by detecting a change in the surroundings relative to the body. In such embodiments, the motion capture devices may be configured to measure the strength and/or speed of a body's motion. In various embodiments, the one or more sensors may include one or more optical cameras and/or one or more thermographic (IR) cameras, which may be configured to form images using IR radiation. Such IR cameras may be similar to optical-lens cameras, which form images using visible light, but instead operate in wavelengths in the infrared range of the electromagnetic spectrum. In embodiments where the sensors include one or more IR cameras, the sensors may also include an IR projector and/or IR laser projector, which may be configured to project an IR beam at one or more targets and sense a reflection of the infrared beam being reflected off the one or more targets.

In some embodiments, the IR projector may be an IR LED that emits IR radiation as the IR beam or signal. The IR beam or signal may be a sequence of flashes or pulses that are emitted at a predefined frequency. In response to detection of an IR beam/reflection, in some embodiments the wand 125 may provide one or more first instructions to one or more first devices and/or provide one or more second instructions to one or more second devices according to the various example embodiments disclosed herein. Additionally, the IR camera may detect IR beams being emitted by other devices, such as other wands 125 and/or other computing devices 105. In various embodiments, the IR beams may include one or more messages described herein. In such embodiments, the IR camera may sense or otherwise detect the sequence of flashes or pulses of the IR beam, which may then be converted into the aforementioned messages according to known methods. It should be noted that in some embodiments, the IR camera and the IR projector may be separate from the wand 125. For example, the IR camera and the IR projector may be included in an IR target that may be a device 101 (e.g., an auxiliary device) that is communicatively coupled to the computing device 105 and/or the wand 125. It should be noted that the aforementioned messages are not limited to being transmitted/received via IR beams, and in various embodiments, such messages may be communicated via other signals, such as Bluetooth or BLE signals, WiFi signals, and/or any other wireless signals discussed herein. Such messages may be communicated directly between wand 125 and/or computing devices 105, or such messages may be communicated by way of an intermediary device, such as via beacon 110, a home or local server, a WiFi router, or other like network device. Moreover, each of the aforementioned messages may be communicated by way of a different wireless signal, for example, quest initiation messages and/or team forming messages may be communicated via a WiFi signal, and spell messages may be communicated via one or more IR beams.

In various embodiments, in addition to determining the orientation of the wand 125, the one or more sensors may be used to determine the directionality of the wand 125. The orientation of the wand 125 may be an angle of the wand 125 relative one or more objects, such as a body part of the user of the wand 125. The directionality may indicate a direction in which the wand is directed and/or being pointed by the user. In this regard, the wand 125 may have a defined portion from which a spell output is to be applied (or a region of effect (ROE) is to be directed and/or focused). The defined portion may include, for example, a front portion or tip portion (e.g. tip portion 208 as shown in FIG. 6) from which the spell or "magic" is to emanate. Accordingly, in various embodiments, the wand 125 may use the position and/or orientation information from the one or more sensors to distinguish one portion of the wand 125 from other portions of the wand.

In some embodiments, the one or more sensors may sense environmental factors, which may be included with the spell sequence and used to determine a spell intensity and/or spell output. The environmental factors may include any information regarding an environment of the gaming environment 100, such as ambient lighting, surrounding electromagnetic fields, and/or any other like biotic or abiotic factors surrounding the wand 125.

As noted previously, the changes in the positions and/or orientations of the wand 125 may be indicative of one or more gestures performed by a user of the wand 125. The one or more gestures may include bodily movements, voice commands, and/or other like inputs, such as pressing a button 210 of the wand 125 and the like. The bodily movement gestures may include any action or movement of the wand 125 made by the user. The bodily movement gestures can originate from any bodily motion or state, but because the wand 125 is typically embodied as a handheld device, the one or more gestures may originate from a hand of a user. Additionally, the bodily movement gestures may be based on a height and/or body part lengths of the user, which may be based on the accuracy of the spatial coordinate data detected by the one or more sensors. For example, a first user that makes a circular motion with an extended arm may yield different spatial coordinate changes than a second user that makes a similar circular motion with an extended arm, such as when the height and and/or arm length of the first user are greater than the height and and/or arm length of the second user. In this instance, the circular movement made by the first user may produce a larger circumference than a circumference of the circular movement made by the second user. Additionally, a bodily movement gesture can include not only movement of the wand 125, but may also be based on a body position established by a user. Furthermore, in various embodiments, the voice command gestures may include specific sounds or words that are pronounced by the user of the wand 125. It should be noted that the sounds or words do not have to be previously known in any human language, but rather, the sounds or words may only be required to be repeatable by the user. In various embodiments, the wand 125 may be configured to record voice command gestures, and communicate those recordings to the computing device 105 for voice recognition. In other embodiments, the wand 125 may be configured to perform the voice recognition of the voice command gestures. The voice recognition methods and systems are known or commercially available, and are readily implemented by persons having ordinary skill in the art, particularly in light of the disclosure herein.

In various embodiments, wand 125 may include one or more feedback/output devices, which are internal to the wand 125, attached to a housing 205 of the wand 125, and/or communicatively coupled with the wand 125 and/or computing device 105. The devices that are internal, attached, and/or communicatively coupled with the wand 125 and/or computing device 105 may be referred to as "first devices". The one or more first devices may be used to provide feedback or other like indications as to whether a spell has been properly performed or not (within a certain margin of error). The first devices may include one or more audio devices, one or more light emitting diodes, one or more haptic feedback devices and/or one or more actuators, one or more heating elements, and the like. In some embodiments, the first devices may include a display device and/or a projector. The wand 125 may instruct or otherwise activate the one or more first devices by issuing one or more instructions or control signals to the one or more first devices, which are referred to herein as "first instructions". The first instructions may be defined by a spell output, which is associated with one or more spells, wherein the spell output indicates to issue the first instructions upon completion of an associated spell (within a certain margin of error). The spell output may also define or otherwise indicate a spell output intensity, which may be an intensity level at which to activate the one or more first devices. The first instructions and/or control signals may instruct and/or control the one or more first devices to output a desired audio output at a desired volume level and/or for a desired playback time when the one or more first devices include the one or more audio devices; emit a desired light sequence and/or illumination level/intensity when the one or more first devices include the one or more light emitting diodes; activate at least one of a vibration and a mechanical motion at a desired intensity and/or for a desired period of time when the one or more first devices include the one or more haptic feedback devices, one or more actuators, and/or one or more transcutaneous electrical nerve stimulation (TENS) devices; and heat the wand to a desired temperature when the one or more first devices include the one or more heating elements. Furthermore, in various embodiments, the first instructions may indicate to turn off or shut down various functions, such as shutting off one or more LEDs. In some embodiments, the first instructions may include sending (additional) game-related messages to other users in the gaming environment 100 (e.g., "fireball from user A exploded at position (X,Y,Z) including 10 points damage to players B and C and/or devices within 5 meters of position (X,Y,Z)").

As noted previously, the first devices may include devices that are communicatively coupled with the wand 125 and/or computing device 105. Such devices may include Bluetooth earpieces, headphones, and/or speakers; a head-mounted (or helmet-mounted) display device; a head-mounted (or helmet-mounted) augmented reality headset; and the like. In embodiments, where the first instructions indicate to play an audio output and/or a video output, the files associated with the audio output and/or video output may be stored in a computer-readable medium of the computing device 105, stored in a computer-readable medium of the wand 125, and/or the output files may be streamed or otherwise provided to the computing device 105 and/or the wand 125 from a content provider on-demand, which may then be output via the communicatively coupled output device. Additionally in various embodiments, an audio output or video output (e.g., a sound effect, etc.) may indicate the success or failure of the spell output. For example, one or more sound effects that vary in tone, sequence, and/or amplitude may be used to indicate the level of success of the spell output. In some embodiments, the audio/video output may include corresponding effects to indicate different amounts of spell output intensities, such as by using a fizzling sound and the like. In other embodiments, a sound effect may be a recorded or synthesized utterance, which may provide a message such as "Your spell has completed properly" or "Your spell has not completed properly". Furthermore, in various embodiments a haptic and/or visual response (e.g., vibration and/or LED illumination, etc.) may also be generated from the wand 125 to be used in combination with one or more sound effects. Moreover, the first instructions (and/or the second instructions described herein) may indicate that a gesture was incorrectly performed or missing from a spell sequence, the user has insufficient authorization to perform a spell (e.g., a wand 125 is not authorized to perform the spell or obtain the spell output), the performance of a spell was done at an unauthorized location and/or spatial coordinates, the user has insufficient game play property/points for performing the spell or obtaining the spell output, the performance of the spell is impossible (e.g., an "open door" spell is performed when there is no door proximate to the wand 125), a game play parameter item in the gaming environment 100 is interfering with the spell ("fireball inhibitor prevents fireball spells in a particular room"), and the like.

Wand 125 may be configured to send/receive data to/from a computing device 105, one or more devices 101, and/or a network element (e.g., accounting server 120, etc.) via a direct wireless connection and/or via a network connection (e.g., network 115). For example, the wand 125 may directly connect with one or more devices via the direct wireless connection by using, for example, Bluetooth and/or BLE protocols, WiFi protocols, Infrared Data Association (IrDA) protocols, ANT and/or ANT+ protocols, 3rd Generation Partnership Project (3GPP) Long Term Evolution (LTE) Proximity Services (ProSe) protocols, and the like. In some embodiments, wand 125 may connect with one or more devices (e.g., devices 101 and/or computing device 105) via network 115 in accordance with one or more wireless communications protocols and/or one or more cellular phone communications protocols. In such embodiments, wand 125 may be configured to operate in accordance with the Global System for Mobile Communications (GSM), Enhanced Data GSM Environment (EDGE), wideband code division multiple access (WCDMA), code division multiple access (CDMA), time division multiple access (TDMA), Bluetooth, Wireless Fidelity (Wi-Fi) such as the Institute of Electrical and Electronics Engineers (IEEE) 802.11a, IEEE 802.11b, IEEE 802.11g, IEEE 802.11ac, and/or IEEE 802.11n, voice over Internet Protocol (VoIP), Wi-MAX, LTE, and/or any other wireless communication protocols.

In various embodiments, by utilizing a direct wireless connection or a network connection, wand 125 may operate, control, or otherwise activate one or more external feedback/output devices (also referred to as "second devices" herein). Referring to FIGS. 1-3, the one or more external feedback/ output devices may include the devices 101 and/or the computing device 105. The one or more second devices may be used to provide feedback or another like indication as to whether a spell has been properly performed or not (within a certain margin of error). The second devices may include one or more components of computing devices 105 and/or other computing devices, one or more auxiliary devices, one or more IoT devices, one or more audio devices, one or more display devices, one or more other wands 125, and the like. It should be noted that in various embodiments, an IoT device may include one or more display devices and/or one or more audio devices. The wand 125 may instruct or otherwise activate the one or more second devices by communicating one or more instructions or control signals over the direct wireless connection or via the network connection to the one or more second devices (also referred to as "second instructions" herein). The second instructions may be defined by a spell output, which is associated with one or more spells, wherein the spell output indicates to issue the second instructions upon completion of an associated spell. The second instructions and/or control signals may instruct and/or control the one or more second devices to execute desired program code when one or more second devices include the computing device 105 and/or one or more other computing devices; access one or more services associated with one or more IoT devices when the one or more second devices include one or more IoT devices; output a desired audio output when the one or more second devices include one or more audio devices; output a desired video output when the one or more second devices include one or more display devices; move to another location, change a position, or otherwise activate one or more electro-mechanical components when the one or more second devices includes a robot, a robotic vehicle, an unmanned aerial vehicle (UAV), a drone, and/or the like; and/or record a spell output when the one or more second devices include one or more other wands 125 and/or one or more other computing devices 105. Furthermore, in various embodiments, the second instructions may indicate to turn off or shut down various functions, such as shutting off a video display, etc. In some embodiments, the second instructions may include sending (additional) game-related messages to other users in the gaming environment 100 (e.g., "fireball from user A exploded at position (X,Y,Z) including 10 points damage to players and/or devices within 5 meters of position (X,Y,Z)"). Moreover, the second instructions may indicate that a gesture was incorrectly performed or missing from a spell sequence, the user has insufficient authorization to perform a spell (e.g., a wand 125 is not authorized to perform the spell or obtain the spell output), the performance of a spell was done at an unauthorized location and/or spatial coordinates, the user has insufficient game play property/points for performing the spell or obtaining the spell output, the performance of the spell is impossible (e.g., an "open door" spell is performed when there is no door proximate to the wand 125), a game play parameter item in the gaming environment 100 is interfering with the spell ("fireball inhibitor prevents fireball spells in a particular room"), and the like.

According to various embodiments, wand 125A may include or otherwise be associated with a region of effect (ROE) 130A and wand 125B may include or otherwise be associated with a region of effect (ROE) 130B (collectively referred to as "region of effect 130" or "ROE 130"). ROE 130 defines an area in which a spell output is to be applied such that one or more devices 101 within the ROE 130 are activated when a spell is performed using the wand 125. In various embodiments, the ROE 130 is determined by the computing device 105 coupled with the wand 125 (e.g., computing device 105A coupled with wand 125A as shown in FIGS. 1-3). In such embodiments, the computing device 105 may determine a shape and/or size of the ROE 130, and determine whether one or more devices 101 and/or other wands 125 are within the ROE 130 based on a position of the devices 101 and/or other wands 125. The positions of the one or more other devices 101 and/or other wands 125 may be indicated by an identifier or other like signal being broadcast by a device 101 and/or wand 125, and/or based on a position of the wand 125 relative to the position of a device 101 and/or other wand 125. In other embodiments, the wand 125 may determine the shape and/or size of the ROE 130, and determine whether one or more devices 101 and/or other wands are within the ROE 130. In some embodiments, when multiple devices 101 and/or other wands 125 are within the ROE 130, the computing device 105 and/or wand 125 may activate issue second instructions to each device within the ROE 130. In various embodiments, when multiple devices 101 and/or other wands 125 are within the ROE 130, the computing device 105 and/or wand 125 may determine a spell output target device based on a position of the wand 125 and/or an orientation of the wand 125. The spell output target device may be a device to which the wand 125 is directed by the user, which may be indicated by a portion from which the ROE 130 emanates. Furthermore, in some embodiments, the spell output target device may include multiple second devices while excluding other second devices within the ROE 130.

In various embodiments, the spell output intensity may be based on a distance between the wand 125 and a position of the spell output target device, and/or the spell output intensity may be based on a position of the spell output target device within the ROE 130. The spell output intensity may indicate an intensity at which the one or more second devices within the ROE 130 are to be activated. For instance, a device that is located relatively far from the wand 125 may be activated at a lower intensity than a device that is located relatively close to the wand 125. By way of example, an audio device that is relatively far from the wand 125 may play a desired audio output at a lower volume and/or decrease the volume over time, whereas when the audio device is relatively close to the wand 125, the audio device may play the desired audio output at a higher volume. In various embodiments, spell output intensity may also indicate a brightness level for a display device and/or a device including LEDs, may indicate a termination point of an audio and/or video output that is before the audio and/or video output's prescribed ending, may specify an amount to move an electro-mechanical device, may indicate a game play properties/effects (e.g., damage amounts, health restoration amount, a virtual or physical on/off, open/close, and/or lock/unlock indication, physical dispense amount (vending machines, etc.) a virtual dispense amount for virtual property (points, health, damage loss, gold count, etc.)), and/or the like. In this way, the spell output may have an appearance of attenuation based on the user's position within the gaming environment 100.

In some embodiments, device attributes may be used to determine a spell output and/or spell output intensity. The device attributes may indicate a device type and/or status of one or more peripheral devices and/or internal components (e.g., processor speed, memory utilization, battery charge amounts, etc.) of the wand 125. For example, the wand 125 and/or the computing device 105 may determine that an amount of charge remaining in a battery of the wand 125 is 50%, and the wand 125 and/or the computing device 105 may then reduce the spell intensity output by 50%.

Figure 4:
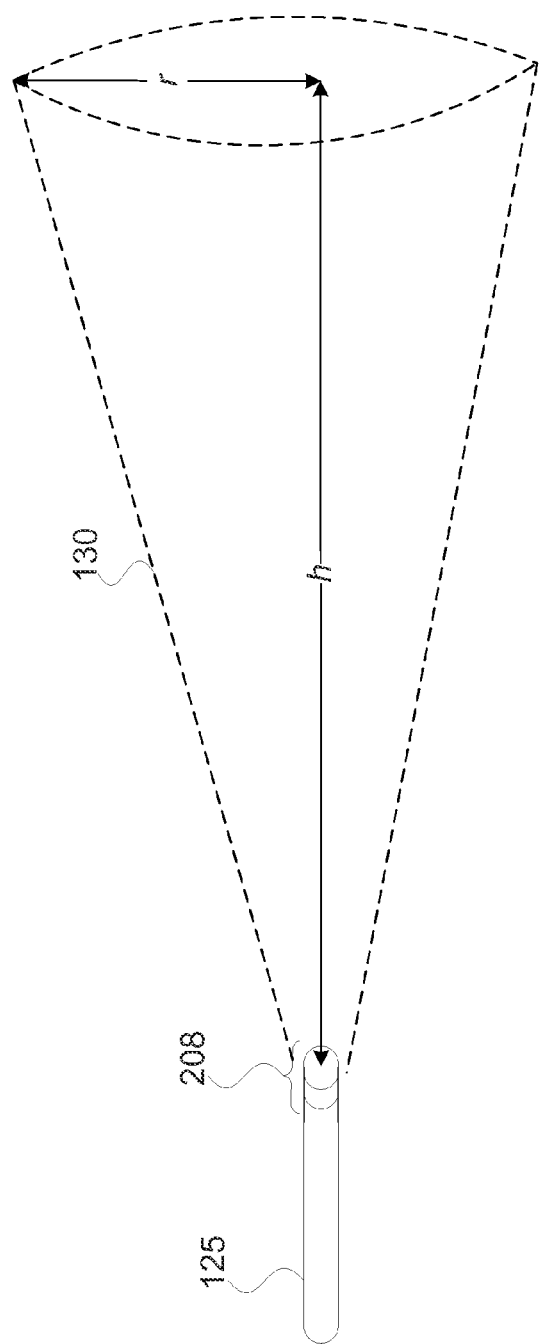

Referring now also to FIG. 4, the ROE 130 is defined by or otherwise has a shape of a cone. In various embodiments, the cone may have an area that is defined by a height h and a base radius r. In various embodiments, the base may be in the shape of a circle or an ellipsis having a radius r. However, in some embodiments, the ROE 130 may be in a pyramidal shape such that the base is a square, rectangular or any other quadrilateral shape. Additionally, although ROE 130 is shown by FIGS. 1-4 as having a conical shape, in various embodiments, ROE 130 may have a cylindrical shape or may have any other type of shape. As shown, an apex of the cone originates from a tip 208, but in some embodiments, the apex could originate from any other like portion of the wand 125. The area of the cone may be calculated using known equations or algorithms for calculating the area and/or volume of a cone. However, it should be noted that the height h, the radius r, and/or the shape of the base may be based on a specific game being played, a specific gaming environment, a spell intensity associated with a user of the wand 125, and the like. For example, the height h and/or the radius r of the ROE 130 may be predefined according to one or more game design criteria, and when the spell intensity is determined to be reduced by 50% due to a battery of the wand 125 having a 50% charge capacity, the values of the height h and/or the radius r of the ROE 130 may be reduced by 50% or may be reduced or otherwise adjusted according to some other game-related value/criteria/rules. By way of another example, the height h and/or the radius r of the ROE 130 may be predefined according to one or more game design criteria, and when the spell intensity is determined to be increased by 50% due to an auxiliary device being proximate to the wand 125, the values of the height h and/or the radius r of the ROE 130 may be increased by an amount indicated by an auxiliary device identifier and/or may be increased or otherwise adjusted according to some other game-related value/criteria/rules.

According to various embodiments, computing devices 105 may be a physical hardware computing device capable of communicating with one or more other hardware computing devices (e.g., wand 125, devices 101, accounting server 120, one or more associated databases (not shown), and the like) via a communications interface, such that computing device 105 is able to receive one or more signals and/or data streams from the other devices in the gaming environment 100. Computing devices 105 may include a transmitter/receiver (or alternatively, a transceiver), one or more memory devices, one or more processors, one or more sensors, and/or other like components. Computing devices 105 may be designed to sequentially and automatically carry out a sequence of arithmetic or logical operations; equipped to record/store digital data on a machine readable medium; and transmit and receive digital data via one or more network devices. Computing devices 105 may include devices such as desktop computers, laptop computers, mobile computing devices (e.g., smart phones, tablet personal computers, wearable computing devices, a handheld messaging device, a personal data assistant, an electronic book reader, and the like), a home or local server, and/or any other physical or logical device capable of recording, storing, and/or transferring digital data via a connection to a network device.

In various embodiments, computing devices 105 may include a network interface (e.g., network interface 430 described with regard to FIG. 8) configured to connect computing device 105 to one or more other devices wirelessly via a transmitter and a receiver (or optionally a transceiver) and/or via a wired connection using a communications port. Computing devices 105 may be configured to send/receive data to/from one or more other hardware computing devices, and/or network devices, such as a router, switch, hub, or other like network devices, via the network interface using the wired connection and/or the wireless connection. Computing devices 105 may be configured to obtain a data (in the form of a data stream, data packets, and/or other like messages) from a network element (e.g., accounting server 120) via the network interface, and utilize the data according to the various example embodiments described herein. Computing devices 105 may communicate over the network 115 in accordance with one or more wireless communications protocols and/or one or more cellular phone communications protocols. For example, computing device 105 may be configured to operate in accordance with the GSM, EDGE, WCDMA, CDMA, TDMA, Bluetooth, Wi-Fi such as IEEE 802.11a, IEEE 802.11b, IEEE 802.11g, IEEE 802.11 ac, and/or IEEE 802.11n, VoIP, Wi-MAX, LTE, and/or any other "wireless" communication protocols, including RF-based, optical, and so forth.

Computing devices 105 may include or be otherwise associated with various input and output/feedback devices to enable user interaction with the computing device 105 and/or peripheral components or devices associated with the computing device 105 by way of one or more user interfaces or peripheral component interfaces. The user interfaces may include, but are not limited to a physical keyboard or keypad, a touchpad or touchscreen, display device(s), speakers, microphones, image sensors, haptic feedback devices and/or one or more actuators, and the like. Peripheral component interfaces may include, but are not limited to, a non-volatile memory port, a universal serial bus (USB) port, an audio jack, and a power supply interface. Furthermore, the computing device may to enable user interaction with peripheral or other like external devices utilizing one or more wireless communications protocols, such as Bluetooth protocols, WiFi protocols, IrDA protocols, ANT and/or ANT+ protocols, 3GPP LTE ProSe protocols, etc. Using the one or more wireless communications protocols, the computing devices 105 may connect with, or otherwise utilize devices 101. The devices 101 may be output/feedback devices, such as display devices (e.g., TVs or "smart TVs", a computing device and associated displays, augmented reality head-mounted (or helmet-mounted) devices, projectors, etc.) and/or audio devices (e.g., Bluetooth earpiece or headphones, speakers, etc.), IoT devices (e.g., automated sensors, motors, etc.), and/or auxiliary devices (which are described in detail elsewhere). Furthermore, the computing devices 105 may connect or otherwise couple with the wand 125 by way of the one or more wireless communications protocols. In some embodiments, the computing device 105 may be associated with an IR target, which may receive an IR signal from a wand 125. In some embodiments, the associated IR target may be attached to the computing device 105, while in other embodiments the IR target may not be connected to the computing device 105. In some embodiments, the IR target may be a device 101 that is communicatively coupled to the computing device 105 and/or the wand 125, or the IR target may be affixed to a wall or other like stationary object. The IR target may include an IR camera and/or an IR emitting device that operate in a same or similar fashion as discussed previously with regard to the wand 125. In response to receiving an IR signal or beam, the computing device 105 may carry out a sequence of arithmetic or logical operations; activate one or more associated output devices; provide one or more first instructions to the wand 125 for activation of one or more first devices and/or provide one or more second instructions to one or more second devices according to the various example embodiments disclosed herein; activate one or more electro-mechanical components; project an image and/or animation; and/or perform any other function as described herein. It should be noted that the aforementioned messages are not limited to being transmitted/received via IR beams, and in various embodiments, such messages may be communicated via other signals, such as Bluetooth or BLE signals, WiFi signals, and/or any other wireless signals discussed herein. Such messages may be communicated directly between computing devices 105 and/or wands 125, or such messages may be communicated by way of an intermediary device, such as via beacon 110, a home or local server, a WiFi router, or other like network device. Moreover, each of the aforementioned messages may be communicated by way of a different wireless signal, for example, quest initiation messages and/or team forming messages may be communicated via a WiFi signal, and spell messages may be communicated via one or more IR beams, or vice versa.

Computing device 105 may be equipped with location (or alternatively "geolocation"), positioning, and/or navigation circuitry, such as a GPS receiver, as well as software to convert received GPS signals into a location and/or position (within some margin of error). In various embodiments, alternate positioning systems may be employed, such as wireless network signal-strength-based indoor positioning system (IPS), hybrid systems combining global and local positioning systems, and/or other like positioning and/or location detection systems. However, in various embodiments, geolocation and/or positioning information may come from other sources including an IP address, Wi-Fi and/or Bluetooth MAC address, radio-frequency identification (RFID), WiFi connection location, GSM/CDMA cell IDs, and the like. Computing devices 105 may include one or more sensors, such as an accelerometer, gyroscope, gravimeter, magnetometer, and/or another like devices that are configured to measure and/or detect a motion, an acceleration, and/or an orientation of the computing devices 105. In such embodiments, the computing devices 105 may be configured to determine a magnitude and direction of an acceleration and/or motion of the computing device 105, and convert the acceleration and/or motion of the computing device 105 into position and/or orientation information. The positions and/or orientations (or changes in the positions and/or orientations) may be used to determine a spell type, spell direction, spell intensity, etc. according to the various example embodiments described herein. For example, the computing device 105 may use its own position and/or orientation data, position and/or orientation data of one or more devices 101 that the computing device 105 has determined, in combination with any position and/or orientation data included with a spell sequence in order to determine a spell type, spell direction, spell intensity, etc.

Computing devices 105 may be configured to run, execute, or otherwise operate one or more applications. The applications may include native applications, web applications, and hybrid applications. The native applications may be used for operating the computing device 105, such as using a camera or other like sensor of the computing device 105, GPS functionality of the computing device 105, an accelerometer of the computing device 105, cellular phone functionality of the computing device 105, and other like functions of the computing device 105. Native applications may be platform or operating system (OS) specific. Native applications may be developed for a specific platform using platform-specific development tools, programming languages, and the like. Such platform-specific development tools and/or programming languages may be provided by a platform vendor. Native applications may be pre-installed on computing devices 105 during manufacturing, or provided to the computing device 105 by an application server (e.g., accounting server 120) via a network (e.g. network 115). Web applications are applications that load into a web browser of the computing device 105 in response to requesting the web application from a service provider (e.g., a web server that may be associated with accounting server 120). The web applications may be websites that are designed or customized to run on a mobile device by taking into account various mobile device parameters, such as resource availability, display size, touchscreen input, and the like. In this way, web applications may provide an experience that is similar to a native application within a web browser. Web applications may be any server-side application that is developed with any server-side development tools and/or programming languages, such as PHP, Node.js, ASP.NET, and/or any other like technology that renders HTML. Hybrid applications may be a hybrid between native applications and web applications. Hybrid applications may be a stand-alone, skeletons, or other like application containers that may load a website within the application container. Hybrid applications may be written using website development tools and/or programming languages, such as HTML5, CSS, JavaScript, and the like. Hybrid applications use browser engine of the computing device 105, without using a web browser of the computing device 105, to render a website's services locally. Hybrid applications may also access mobile device capabilities that are not accessible in web applications, such as the accelerometer, camera, local storage, and the like. The various example embodiments for defining, initiating and commencing a quest performed by the wand 125 and/or the computing device 105 as described herein, such as the processes 1400 and 1500, may be implemented as a native application, a web application, and/or a hybrid application. Such an application may be included in the wand 125 and/or the computing device 105 according to various example embodiments.

Additionally, in some embodiments, the applications for initiating and commencing a wand quest as discussed herein may also interact with one or more other applications via an application programming interface (API). An API may be a defined as a set of HTTP request messages and response messages that allow applications to obtain third-party services. Such request messages and response messages are usually in an XML and/or JavaScript Object Notation (JSON) format. In most embodiments, the applications discussed herein may use an API to access third-party services, such as social networking service, a blog, and/or any other like communication platform. By utilizing an API for such services, a user of the wand 125 may broadcast, to their social network contacts, one or more spells which they have cast using the wand 125, one or more second devices accessed using the wand 125, a time at which the one or more second devices are accessed, and/or other game-related information. In various embodiments, the user of the wand 125 may broadcast a message to such a third-party platform indicating that the wand 125 has been activated, which may be done be performing an authentication spell. Other users of the third-party platform may see such a message and invite the user of the wand 125 to participate in a wand quest, a wand duel, and/or other like wand-based games. In some embodiments, the user of a wand 125 may be able to customize which game-related information to broadcast. The third-party service may be capable of receiving, from the computing device 105, positioning information (e.g., a geolocation of the computing device 105 and/or the wand 125) and spell-related data and may broadcast the positioning information and spell-related data on an associated communication platform. The third-party service may be capable of managing various settings associated with a user of the wand 125 and/or computing device 105, and may post, reformat or adapt the positioning information and spell-related data, as necessary, to the communication platform.

According to various embodiments, devices 101 may be any object, device, sensor, or "thing" that is embedded with hardware and/or software components that enable the object, device, sensor, or "thing" to communicate with another device (e.g., computing devices 105, accounting server 120, another device 101, etc.) over a network (e.g., network 115). The devices 101 may be the same or similar to the "second devices" as described herein, and the devices 101 may also be referred to as "second devices 101". In some embodiments, the device 101 may communicate with other devices with little or no user or human intervention, such as when the device 101 is an IoT device. In this regard, devices 101 may include a transmitter/receiver (or alternatively, a transceiver), one or more memory devices, and/or one or more processors. Furthermore, devices 101 may be embedded with or otherwise include a transmitter or other like device that broadcasts an identification signal. In various embodiments, the identification signal may be a radio-based signal, such as a Wi-Fi signal, BLE signal, an active RFID signal, an infrared signal, and the like. According to various embodiments, the identification signal may comprise one or more data packets or data frames, where the data packets or data frames include a unique identifier associated with the device 101 transmitting the identification signal. In various embodiments, the unique identifier (or alternatively, "identifier" or "identification information") may include a universally unique identifier (UUID), an electronic product code (EPC), a media access control address (MAC address), an Internet Protocol (IP) address, an Apache QPID address, and/or any other like identification information. It should be noted that one or more of the devices 101 may be manufacturer, developed, and/or deployed in the gaming environment 100 by different device manufacturers.

In various embodiments, devices 101 may be output/feedback devices, such as display devices, audio devices, IoT devices, and the like. Devices 101 that are IoT devices may include any type of sensor, meter, or other like device that can capture and/or record data associated with an event. For instance, in various embodiments, IoT devices may be biotic sensors and/or devices, such as monitoring implants, biosensors, biochips, and the like. Additionally, IoT devices may be abiotic sensors and/or devices, such as autonomous sensors and/or meters, Machine Type Communications (MTC) devices, machine to machine (M2M) devices, and the like. An event may be any occurrence of an action, such as a temperature change, a change in data such as reaching a data threshold, a game-play point/property/inventory level/amount change, a heart rate, a state/position/orientation change of a device, and the like. In various embodiments, an event may be detected by one or more IoT devices based on sensor outputs, timer values, user actions, messages from an a computing device, and the like. Once data associated with an event is captured and recorded by the IoT device or other like device 101, the captured data may be relayed through the network 115 and reported to a service provider (e.g., an operator of the accounting server 120), computing device 105, and/or another one of the devices 101. The service provider and/or game operator (e.g., the accounting server 120), a user of the computing device 105A and/or the wand 125A, a user of the computing device 105B and/or the wand 125B, and/or another device 101 may take an appropriate action based on a notification of the event (e.g., calculate a score with respect to a game or quest, and the like, perform a spell, activate/deactivate a device and/or component of a device, etc.). In various embodiments, devices 101 may connect with or otherwise communicate with the computing device 105 and/or accounting server 120 via a direct wireless connection and/or via network 115. In such embodiments, the data associated with an event may be reported to the computing device 105 and/or accounting server 120 for the purposes of spell determination and/or immersive game play as described herein. It should be noted that the devices 101 may be configured to report data/events on a period or cyclical basis, and/or based on a desired event that is captured and recorded by a device 101.

In various embodiments, the computing device 105 and/or wand 125 may receive from one or more devices 101 data associated with a captured event and the computing device 105 and/or wand 125 may physically control the devices 101 by transmitting instructions or other like control signals to the device 101. The instructions and/or control signals may instruct and/or control the devices 101 to execute desired program code when one or more of the devices 101 include one or more other computing devices; access one or more services associated with one or more IoT devices when one or more of the devices 101 include one or more IoT devices; output a desired audio output when one or more of the devices 101 include one or more audio devices; output a desired video output when one or more of the devices 101 include one or more display devices; and/or record a spell output when one or more of the devices 101 include one or more other wands 125 and/or one or more other computing devices 105.

In various embodiments, such as when the second devices 101 are IoT devices, the second devices 101 may include one or more electro-mechanical components which allow the second device 101 to change its state, position, and/or orientation. These electro-mechanical components may include one or more motors, step motors, actuators, wheels, thrusters, propellers, claws, clamps, hooks, and/or other like electro-mechanical components. In such embodiments, the second devices 101 may be configured to change its state, position, and/or orientation based on one or more captured events and/or instructions or control signals received from the computing device 105 and/or wand 125. For example, in embodiments where a second device 101 is an actuator that opens/closes a window, the actuator may change its state (e.g., fully open, fully closed, or partially open/closed) based on instructions from the computing device 105, wand 125, and/or accounting server 120. In such embodiments, the instructions to change the state of the actuator may be issued from the computing device 105, wand 125, and/or accounting server 120 based on whether or not a spell was determined to have been performed correctly or not. In some embodiments, proximity of the wand 125 to an associated device 101 may be required in order for the spell to have an effect. For example, an "open door" spell may have no effect unless the wand 125 is within desired distance from the door to be opened. It should be noted that a performance of one or more actions (e.g., the collection/reporting of data, altering a state, position, and/or orientation, etc.) by one or more devices 101 may be referred to as a "service". The devices 101 may be grouped according to functions that they may perform, where one or more of the functions are associated with one or more services. Furthermore, in various embodiments, the devices 101 may also communicate data associated with one or more events to the accounting server 120 via a network connection, wherein the accounting server 120 may track the progress of a game or otherwise adjust a user's profile according to spell outputs performed by the devices 101.

In various embodiments, one or more of the second devices 101 may be "auxiliary devices". The auxiliary devices may include the same or similar components as the IoT devices discussed herein (e.g., transmitter/receiver, processor(s), memory device(s), etc.). However, in various embodiments the auxiliary devices serve to alter, adjust, or otherwise modify a spell and/or spell intensity. For example, in some embodiments, the auxiliary device may amplify, diminish, or delay an effect of one or more spell outputs. Additionally, the auxiliary device may alter a spell output to include one or more additional first instructions and/or second instructions, such as obtaining and playing an audio output when a spell for illuminating an LED is performed. It should be noted that in some embodiments, an auxiliary device may amplify a spell intensity of a first spell while diminishing the effect of a second spell. In various embodiments, a spell and/or spell intensity may be modified or adjusted when an auxiliary device is within a desired region surrounding the wand 125, or when the auxiliary device is otherwise proximate to the wand 125. In this regard, in various embodiments, the auxiliary devices may be in the form of a wearable device, such as a bracelet, ring, medallion, hat, glove, and the like, while in some embodiments, the auxiliary devices may have a form that allows the auxiliary device to attach itself to a housing 205 of the wand 125. However, the form and/or shape of the auxiliary devices may be based on one or more design choices.

In various embodiments, the proximity of an auxiliary device to the wand 125 may be based on position information contained in an auxiliary device identifier or other like signal that is broadcast by the auxiliary device, which may be obtained by the computing device 105 and/or the wand 125 by scanning of a region surrounding the wand 125 for an auxiliary device signal that is broadcast by the auxiliary device. The auxiliary device identifier may be obtained by the computing device 105 and/or the wand 125, which may then determine the position of the auxiliary device relative to the wand 125 in a similar manner as discussed herein, such as by using IPS and/or triangulation methods.

The auxiliary device identifier may also indicate a desired alteration for a spell output and/or a desired alteration or adjustment to a spell output intensity. For example, the auxiliary device identifier may indicate an amount to increase/decrease area of the ROE 130, such as by adjusting the height h and/or the radius r, etc. By way of another example, the auxiliary device identifier may indicate that a spell output may include additional audio and/or video outputs to be played/displayed with an audio and/or video output associated with a given spell and/or a location from which the additional audio/video outputs may be obtained, such as a webpage address, a memory location, and/or other like location information. By way of yet another example, the auxiliary device identifier may indicate that a spell output may yield additional game related points/property within a game, or may decrease another player's points/property by a specified amount when a spell is performed in the presence of another user (see e.g., FIG. 3). In some embodiments, the desired alteration to the spell output or spell output intensity may be based on a number of times that a spell has been cast using the auxiliary device, and/or based on any other like indication indicating a number of times that the auxiliary device has been used. The number of times that the auxiliary device has been used may be factored into a game or quest, wherein a game operator (e.g., an operator of accounting server 120) or other like entity may limit the number of times that an auxiliary device may be used and/or may diminish the effect that an auxiliary device has based on the amount of usage of the auxiliary device. To this end, in various embodiments, the auxiliary device may include a counter, which indicates a number of uses or a number of spell alterations, and the auxiliary device may provide the counter value in the auxiliary device identifier. In such embodiments, the auxiliary device may increment or decrement the counter each time a spell is cast (i.e., after execution of a spell output). The computing device 105 and/or the wand 125 may then determine whether the spell output may be altered using the auxiliary device based on the auxiliary device counter value, such that, when the auxiliary device counter value has reached an alteration threshold, the alteration to the spell output may be deemed to have expired. In some embodiments, the auxiliary device counter may be loaded with a (or alternatively "predefined") value, and the counter may be decremented each time a spell is cast with the auxiliary device. In such embodiments, the alteration threshold may be zero. In other embodiments, the auxiliary device counter may be set at zero and incremented each time a spell is cast with the auxiliary device. In such embodiments, the alteration threshold may be a desired (or alternatively "predefined") integer that is greater than zero, and the alteration may be diminished or otherwise adjusted based on the integer value. For example, the counter value may be set at 10, the spell output intensity may be increased by 100% when the auxiliary device is used a first time (counter vale of 10), and the spell output intensity may be increased by 90% when the auxiliary device is used a second time (counter vale of 9), and so forth. Moreover, in some embodiments, a determined distance or proximity of the auxiliary device may be used to alter the spell output and/or spell output intensity. For example, in some embodiments, an auxiliary device may increase a size and/or shape of the ROE 130 by a first factor when the auxiliary device is attached to the wand 125, and the auxiliary device may increase a size and/or shape of the ROE 130 by a second factor when the auxiliary device is at a specified distance from the wand 125, wherein the first factor is greater than the second factor.

It should be noted that in various embodiments, the auxiliary devices may not include the auxiliary counter. In such embodiments, the accounting server 120, the computing device 105, and/or the wand 125 may include auxiliary device counters, or similar functionality, to track the usage of corresponding auxiliary devices. In such embodiments, the accounting server 120, the computing device 105, and/or the wand 125 may obtain the auxiliary device identifier via a direct wireless connection or a network connection, and may adjust a user profile and/or increment/decrement an auxiliary device counter accordingly.

In some embodiments, an auxiliary device or other like devices 101 may include an IR target including an IR emitting device and/or IR camera that may operate in a same or similar fashion as discussed previously with regard to the wand 125. In such embodiments, the auxiliary device or device 101 may detect an IR beam transmitted from the wand 125 and/or the computing device 105, and in response to detection of such a beam, the auxiliary device and/or devices 101 may perform various functions, such as adjust the auxiliary counter values (e.g., increase or decrease the auxiliary counter values), etc., relay or otherwise communicate various messages as described herein, and the like. It should be noted that the performance of the aforementioned functions are not limited to transmitted/received via IR beams, and in various embodiments, such functions may be performed based on the reception/detection of other signals, such as BLE signals, WiFi signals, and/or any other wireless signals discussed herein. Such messages may be communicated directly between an auxiliary device 101 or other device 101 and an associated computing device 105 and/or wand 125, or such messages may be communicated by way of an intermediary device, such as via beacon 110, a home or local server, a WiFi router, or other like network device.

According to various embodiments, beacon 110 may be a network element or a transmitting/receiving device configured to provide communication services and positioning services to various devices (e.g., devices 101, computing device 105, and/or wand 125) operating within a gaming environment 100 or a communications network (e.g., an enterprise private network, virtual private network, local area network (LAN), a virtual LAN (VLAN), and/or any other like computer network). The beacon 110 may be a wired or wireless access point, a router, a switch, a hub, and/or any other like network device that allows computing devices to connect to a network. In some embodiments, the beacon 110 may include one or more processors, a network interface, one or more transmitters/receivers connected to one or more antennas, and computer readable media. The one or more transmitters/receivers may be configured to transmit/receive data signals to/from one or more devices 101 and/or computing devices 105. The beacon 110 may process and/or route data packets according to one or more communications protocols, such as Ethernet, Point-to-Point Protocol (PPP), High Level Data Link Control (HDLC), Internet Protocol version 4 (IPv4), Internet Protocol version 6 (IPv6), and/or any other like protocols. The beacon 110 may employ one or more network interfaces in order to allow devices 101 and/or computing devices 105 to connect to network 110, such as Ethernet, Fibre Channel, G.hn or ITU-T, 802.11 or Wi-Fi, Bluetooth, and/or any other like network connection interfaces. In various embodiments, beacon 110 may be a low-powered transmitter/receiver that may be used to notify various devices of their position relative to one or more other devices. In such embodiments, the beacon 110 may utilize BLE proximity sensing methods to transmit an identifier to devices within a vicinity of the beacon 110.

In various embodiments, the beacon 110 may provide the wand 125, computing devices 105, and/or devices 101 with a position of the beacon 110 such that the wand 125, computing devices 105, and/or devices 101 may determine their own position relative to one or more other devices by way of triangulation. In such embodiments, an exact geolocation or position may not be necessary for the performance of a spell output as long as the various devices in the gaming environment 100 may determine their own position relative to one or more other devices in the gaming environment 100. One method of triangulation may include the computing device 105A performing a received signal strength indication (RSSI) calculation of one or more signals generated by one or more other devices (e.g., the computing device 105B and/or other computing devices 105, one or more devices 101, etc.) and a RSSI calculation of one or more signals generated by the beacon 110. Another method of triangulation may include the computing device 105A and/or the wand 125A obtaining a RSSI calculation performed by computing device 105B and/or wand 125B of one or more signals generated by another device and/or a RSSI calculation of one or more signals generated by the beacon 110, which may then be shared with the computing device 105A. Another method of triangulation may include the beacon 110 performing a RSSI calculation of one or more signals generated by multiple devices in the gaming environment 100, which may then be shared with the computing devices 105 and/or the wands 125 in the gaming environment 100. The aforementioned RSSI calculations may be performed by the beacon 110, the wands 125, and/or the computing devices 105 according to know methods. Additionally, instead of, or in addition to using the RSSI of the signals generated by the various devices in the gaming environment 100, example embodiments may also utilize other information associated with the one or more signals, such as a path loss measurement, packet delay time, a signal to noise ratio, a measure of throughput, a jitter, latency, a round trip time (RTT), a number of interrupts, an out-of-order delivery of data packets, and/or other like parameters. Furthermore, any of the aforementioned triangulation methods may be combined to determine a device's position relative to one or more other devices in the gaming environment 100. As such, in various embodiments, more position and/or orientation information may become available as a number of devices in a gaming environment 100 increases. In some embodiments, only the RSSI of a proximate device is used instead of one or more of the aforementioned triangulation methods, such as by defining that a signal strength of a second device 101 must be greater than a threshold to indicate that the computing device 105 and/or the wand 125 is within some desired distance from the second device 101. Moreover, directional signal reception or/and transmission of one or more directional antennas may be also used to determine orientation of the various devices in gaming environment 100. As discussed previously, one or more gestures may be performed to obtain one or more spell outputs. In some embodiments, one or more gestures may be designed to facilitate the orientation calculation, such as when a user is required to manipulate the wand 125 in a defined manner and/or at a defined position in order to obtain the spell output. For example, a quest or game may be defined such that a player is required to move a wand from side-to-side so in or around a geocaching device wherein the side-to-side motion would place the wand in the middle of a coverage sector of a directional antenna of the geocaching device. In this case, directional antenna of the wand 125 and/or a directional antenna of the geocaching device may estimate an approximate wand orientation relative to the geocaching device.

In some embodiments, voice commands issued by one or more users may be used to determine a position of one or more device. For example, in a gaming environment 100 that has an electronically controlled window, which may be configured to turn opaque or transparent based on applied electrical charge. A "Transparency" spell might be used to make the window transparent, wherein a user pointing the wand 125 at the window and issuing a voice command of "Transparify" or other such utterance. Because the utterance relates to windows, as opposed to door locks, etc., the voice command may provide additional information or another like indication of a region in which a wand 125 is located. In some embodiments, dead reckoning may be used to maintain orientation and/or position of the wand 125 and/or computing device 105. Dead reckoning may include a process of calculating a device's current position by using a previously determined position (or fix), and adjusting that position based on known and/or estimated speeds over elapsed time and a projected movement pattern. Dead reckoning methods may be used to estimate a rough or general region in which one or more devices are location. It should be noted that relatively low accuracy of the orientation and position may be needed, for example, to indicate that dueling wands 125 (as shown in FIG. 3) may each be pointing in each other's direction. Additionally, since the dead reckoning may provide relatively low accuracy, the dead reckoning calculations may be used to complement and/or to periodically adjust the other positioning and/or triangulation methods described herein.

It should also be noted that, in addition to the various position determination methods and/or triangulation methods discussed above, when the gaming environment 100 is an arena or other like defined region or venue, additional mechanisms may be added to the gaming environment 100 for position determination, such as one or more cameras or other like sensors, one or more stationary targets, and/or floor-mounted pressure sensors. The cameras and/or sensors (optical and infra-red) may be used in combination with known vision recognition algorithms, which may determine a relative distance of the user (either the user's body or the computing device 105) to a known position within the field of view. In various embodiments, simplified processing may be achieved using one or more targets, such as UV fluorescent or IR-reflecting "dots". In some embodiments, a relative position may be based on a round trip time (RTT) including a time a signal (e.g., an IR signal) is emitted from a device (e.g., an IR signal generator of the wand 125 and/or computing device 105), reflected off a target, and captured or detected by the same or another device (e.g., an IR capture device or camera of the wand 125 and/or computing device 105). In such embodiments, the RTT may be used to determine a distance between a wand 125 and a spell output target device (e.g., a second device 101, another wand 125, etc.). The one or more targets may be stationary landmarks, or wands 125, computing device 105, and/or the user may include easily identifiable visual or non-visible markers. In some embodiments, Real-Sense Technology® developed by Intel® may be employed to further enhance position and/or orientation determination.

According to various embodiments, network 115 may be any network that allows computers to exchange data. Network 115 may include one or more network elements (not shown) capable of physically or logically connecting computers. The network 115 may include any appropriate network, including an intranet, the Internet, a cellular network, a local area network (LAN), a personal network or any other such network or combination thereof. Components used for such a system can depend at least in part upon the type of network and/or environment selected. Protocols and components for communicating via such a network are well known and will not be discussed herein in detail. Communication over the network 115 may be enabled by wired or wireless connections, and combinations thereof.

According to various embodiments, accounting server 120 may be one or more hardware computing devices that may include one or more systems and/or applications for providing one or more services. The accounting server 120 may include one or more processors, one or more memory devices and/or computer readable storage medium, and one or more network interfaces. In order to provide the one or more services, the accounting server 120 may be capable of communicating with one or more other hardware computing devices (e.g., wands 125, devices 101, computing devices 105, one or more associated remote and/or local databases (not shown), and the like) via the communications interface, such that the other hardware computing device(s) is able to receive and provide signals and/or data streams from the other devices in the gaming environment 100. Additionally, accounting server 120 may be a single physical hardware device, or may be physically or logically connected with other network devices, such that the accounting server 120 may reside on one or more physical hardware devices. Moreover, accounting server 120 may be connected to, or otherwise associated with one or more data storage devices (not shown).

The accounting server 120 may be any device capable of receiving and responding to requests from one or more client devices (e.g., computing devices 105, wand 125, and/or devices 101) across a computer network (e.g., network 115) to provide one or more services. In various embodiments, the services may include accounting for, or otherwise operating an immersive gaming experience. In such embodiments, the accounting server 120 may alter or adjust a user profile associated with a user of the wand 125. The user profile may indicate game criteria or parameters associated with the user in connection with a game or quest, or in relation to multiple users playing one or more games or quests. The accounting server 120 may account for or otherwise track game play points/property and/or game play effects, such as virtual property/points tallies (including points, health, damage loss, gold count, power levels, "magical power", etc.), a virtual or physical on/off, open/close, and/or lock/unlock indication, physical dispense amounts, virtual dispense amounts, and/or the like. In some embodiments, the casting of a spell may decrease the casting user's game play points/property by a desired amount of game play points/property and/or may decrease another user's game play points/property by a desired amount of game play points/property. In some embodiments, one or more spells may be defined by a game operator to require a desired amount of game play points/property (e.g., "magical power", points, and/or the like) in order to cast the one or more spells or perform the spell outputs associated with those spells. In various embodiments, the game play properties may be represented as a numerical value that is accounted for by the accounting server 120. The user's magical power value may increase or decrease based on other factors, such has the passage of time, completing quests, proximity of devices 101, etc. Additionally, in some embodiments, a game operator may specify spells that may be used during a game and/or exclude other spells from being used during that game. In various embodiments, the accounting server 120 may track time-based conditions, such as the number of times during a time period that a spell has been performed, restricting a spell performance to a desired number of time or during desired times of a day, etc. In various embodiments, the accounting server 120 may track and/or account for multiplayer conditions, such as determining whether a spell is properly performed, which may require the performance of one or more gestures by one or more other users. For example, a spell may require a first user to perform a first bodily movement and utter a first voice command, followed by a second user performing a second bodily movement and uttering a second voice command. In other embodiments, the user may be required to perform their gestures concurrently.

Furthermore, in various embodiments, the accounting server 120 may also track prerequisite conditions defined by a game. For example, a game operator may define that a user must complete some prerequisite task in order to perform one or more spells and/or obtain one or more spell outputs. In some embodiments, the prerequisite task may include activating one or more second devices 101. In such embodiments, the accounting server 120 may communicate with the one or more second devices 101 to obtain event data recorded by the one or more second devices 101 to determine whether the prerequisite task has been completed by the wand 125 and/or computing device 105. For example, the prerequisite task may indicate that the user must complete some physical exercise or submit information via a web based user interface. Furthermore, the accounting server 120 may account for third party (e.g., parent, commercial entity, etc.) controls, wherein a third party may be required to authorize a spell to be used. In some embodiments, restrictions to spell usage may further modify the various conditions listed above. Additionally, in some embodiments, a spell may be restricted to be performed only on specific wands 125, such as a premium upgraded wand 125, a user's wand 125 that is associated with a service or gaming subscription, and the like. In some cases, a game operator and/or an authorized third party may nullify a spell and/or a spell output, which may result in a loss of points, status, or other game/quest progress.

It should be noted that in various embodiments, one or more spell may require coordination among the multiple users in a gaming environment 100. For example, in a wand duel (as illustrated by FIG. 3), the two computing devices 105A and 105B may be required to coordinate with each other to determine a specific timing and/or order that spells are cast by each user. In some embodiments, the accounting server 120 may provide the spell coordination between the two computing devices 105A and 105B. If the accounting server 120 is not involved with the coordination between users, the accounting server 120 may be responsible for final spell processing and resolution. The spell processing and resolution may include decrementing a user's available power level (virtual and/or physical) and/or a power level amount required for a certain spell. In some embodiments, the computing devices 105 may perform the spell processing and resolution, and may report the results of the spell processing and resolution to the accounting server 120. However, in some embodiments, messages related to spell processing and resolution may be sent directly between the two computing devices 105A and 105B and/or sent indirectly between the two computing devices 105A and 105B via the back-end service (e.g., accounting server 120) and/or via a network connection.

For adjusting the user profile and/or operating a game or quest, the accounting server 120 may also perform or facilitate user setup and play registration, including associating a specific wand 125 with authorized users, initiate and control software and/or firmware updates of the elements or devices within the gaming environment 100, record the results associated with one or more games or quests, provide requested user authentication credentials, allow for recording new spells associated with the wand 125, provide content management, provide user interfaces and/or control elements for setting up new games/quests and/or modifying existing spells and/or games/quests, and (optionally) perform computationally intensive tasks.

As discussed previously, the accounting server 120 may be associated with one or more remote and/or local databases. In some embodiments, the accounting server 120 may be associated with an authentication spell database (or a plurality of databases) that stores a list of authentication spells in association with corresponding authentication spell outputs and/or other like information as discussed herein. Furthermore, the authentication spell database may also store one or more wand identifiers in association with each authentication spell, authentication spell sequence, and/or authentication spell output. Such wand identifiers may also be associated with a user identity, subscription related information, game-related information, demographic information, and the like. It should be noted that the accounting server 120 may provide one or more of the stored authentication spells, authentication spell sequences, and/or authentication spell outputs to one or a plurality of wands 125 according to the various example embodiments disclosed herein.

In providing one or more game-related and/or non-game-related services, the accounting server 120 may be able to generate content such as text, graphics, audio, and/or video to be transferred to computing device 105, which may be served to the wand 125 and/or the one or more devices 101 by way of a web server (not shown) in the form of HTML, XML, MPEG-DASH, and/or any other appropriate structured language. Such requests may include providing registration information, such as setup-start indicators and/or setup-termination indicators, as discussed herein. The handling of all requests and responses, (e.g., requests for item information and the information provided in response) as well as the delivery of content between the computing devices 105 and/or wand 125 and the accounting server 120 may be handled by the web server. The accounting server 120 may include an operating system that may provide executable program instructions for the general administration and operation of accounting server 120, and may include a computer-readable medium storing instructions that, when executed by a processor of the application server 120, may allow the accounting server 120 to perform its intended functions. Suitable implementations for the operating system and general functionality of the servers are known or commercially available, and are readily implemented by persons having ordinary skill in the art, particularly in light of the disclosure herein. Furthermore, it should be understood that the accounting server 120 may not be required and the applications and software components discussed herein may be executed on any appropriate device or host machine.

As shown in FIGS. 1-4, only two computing devices 105A and 105B, two wands 125A and 125B, a single accounting server 120, and four devices 101 are present. However, according to various embodiments, any number of computing devices, any number of second devices, any number of servers, and/or any number of databases (not shown) may be present. Additionally, in some embodiments, accounting server 120 and/or one or more databases may be virtual machines and/or they may be provided as part of a cloud computing service. In various embodiments, accounting server 120 and one or more databases may reside on one physical hardware device, and/or may be otherwise fully integrated with one another. Thus, the depiction of the illustrative gaming environments 100 in FIGS. 1-4 should be taken as being illustrative in nature, and not limited to the scope of the disclosure.

Figure 5:
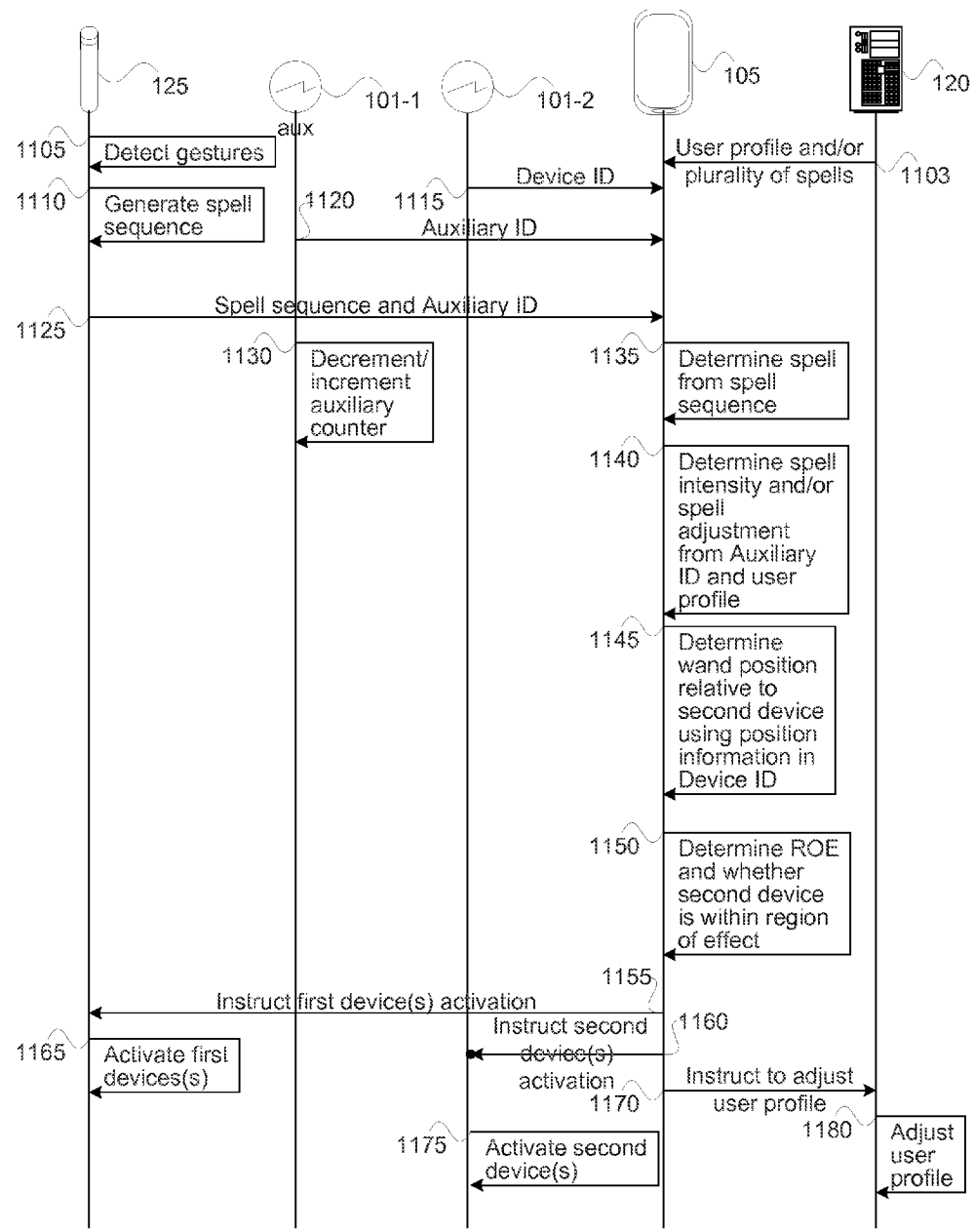
FIG. 5 illustrates a data flow diagram for devices operating in a gaming environment, in accordance with various example embodiments.

FIG. 5 illustrates a data flow diagram for the various devices operating in a gaming environments 100A-C, in accordance with various example embodiments. FIG. 5 illustrates the communications between the wand 125, an auxiliary device 101-1, a second device 101-2, the computing device 105, and the accounting server 120, as described with reference to FIGS. 1-3. It should be noted that in various embodiments the second device 101-2 may be replaced by another wand 125 (e.g., wand 125B).

Referring to FIG. 5, at operation 1103, the computing device 105 may obtain a user profile and/or a plurality of spells from the accounting server 120. The user profile and/or the plurality of spells may be indicative of a game that the user of the wand 125 is playing or desires to play. Each of the plurality of spells may be associated with a desired spell sequence and one or more spell outputs. In various embodiments, the plurality of spells may be stored as an indexed table or other like database structure in a memory device of the computing device 105 or in cloud storage associated with the computing device 105. Such a database may be queried by the computing device 105 according to known methods. Subsequently or simultaneously to operation 1103, at operation 1105 the wand 125 detects one or more gestures being performed by a user of the wand 125.

At operation 1105, the wand 125 may generate a spell sequence based on the detected one or more gestures. In various embodiments, the generated spell sequence may include converting sensor data indicative of the one or more performed gestures into a markup language, a hypertext language, a text file, firmware, middleware, microcode, hardware description languages, or any combination thereof that may be executed or otherwise interpreted by the computing device 105. At operation 1115, the computing device 105 may obtain a device identifier (ID) or other like signal from a device 101 within an ROE 130 of the wand 125. For example, as shown in FIG. 1, which shows an example of a quest gaming environment 100A, at operation 1115, the computing device 105 may obtain a device identifier from device 101-2. By way of another example, as shown in FIG. 2, which shows an example of a tagging gaming environment 100C, at operation 1115, the computing device 105A associated with wand 125A may obtain a device identifier from device 101-2, while the computing device 105B associated with wand 125B may obtain a device identifier from device 101-4. By way of yet another example, as shown in FIG. 3, which shows an example of a wand duel that may occur in either gaming environment 100A or 100B, at operation 1115, the computing device 105A associated with wand 125A may obtain a device identifier from wand 125B, while the computing device 105B associated with wand 125B may obtain a device identifier from wand 125A.

At operation 1120, the computing device 105 may obtain an auxiliary device identifier (ID) from an auxiliary device 101-1. According to various example embodiments, the auxiliary device ID may indicate to increase a size of the ROE 130. At operation 1125, the spell sequence generated at operation 1110 is sent to the computing device 105. It should be noted that in various embodiments, operations 1115, 1120, and 1125 may be performed in an alternate order than shown, and/or operations 1115, 1120, and 1125 may be performed substantially simultaneously. At operation 1130, the auxiliary device 101-1 may decrement/increment its auxiliary device counter. It should be noted that operation 1130 may be performed at any time after the auxiliary device ID is obtained by the computing device 105, such as after a spell output is performed at one of operations 1155, 1160, 1165, and/or 1175.

At operation 1135, the computing device 1135 may determine a spell based on the spell sequence. In various embodiments, the computing device 105 may compare the spell sequence with the defined spell sequences of the plurality of spells to find or otherwise determine a matching spell. Once the computing device 105 determines the matching spell, the computing device 105 may determine the spell output associated with the matching spell.

At operation 1140, the computing device 105 may determine a spell output intensity and/or spell output adjustment based on the auxiliary device ID and/or a user profile. In various embodiments, the spell output intensity may also be based on the information from the user profile and/or one or more game parameters associated with the game that the user is playing.

At operation 1145, the computing device 105 may determine a position of the wand 125 relative to one or more other devices. For example, the computing device 105 may scan the gaming environment 100A/B/C for signals that are broadcast by the devices 101, which may include one or more data packets, wherein the data packets may include an identifier or other like identifying information, such as a device name (e.g., serial number), device type, position information, and/or other like information. The computing device 105 may then extract the position information from the received data packets. In some embodiments, the computing device may obtain positioning information from the beacon 110, or may use one or more of the aforementioned triangulation methods to determine the positions of the devices 101 relative to the wand 125.

At operation 1150, computing device 105 may determine, based on the positions of the one or more devices relative to the wand 125, a size and/or area of the ROE 130 and whether one or more devices 101 are within the ROE 130. For example, as shown in FIGS. 1-2, device 101-2 is within the ROE 130A of wand 125A, which may be based on the auxiliary device 101-1 extending a range of the ROE 130A. By way of another example, as shown in FIG. 3, wand 125B is within the ROE 130A of wand 125A, which may be based on the auxiliary device 101-1 extending a range of the ROE 130A, whereas the wand 125A is not within the ROE 130B of wand 125B, which may be due to wand 125B not being coupled with an auxiliary device.

At operation 1155, the computing device 105 may instruct first device(s) of the wand 125 to activate in accordance with the defined spell output delineated by the matching spell. The instructions to the first devices may be referred to as first instructions. In various embodiments, the first instructions may indicate to activate one or more internal components of the wand 125, such as one or more LEDs, one or more audio devices, one or more haptic feedback devices, one or more heating elements, and the like. The first instructions may include the spell output intensity level determined at operation 1140. The spell output intensity level may indicate a LED brightness level, color scheme, and/or sequence; a haptic feedback vibration strength and/or duration; and audio output volume and/or duration; a desired temperature level and/or heating during, etc. At operation 1165, the wand 125 may activate the first devices according to the first instructions. The first instructions may activate according to the spell output intensity level included in the first instructions.

At operation 1160, the computing device 105 may instruct second device(s) associated with the wand 125 to activate in accordance with the defined spell output delineated by the matching spell. The instructions to the second devices may be referred to as second instructions. In various embodiments, the second instructions may indicate to activate one or more external feedback/output devices. For example, according to the example embodiment shown by FIG. 1, the second instructions may indicate to activate device 101-2, which is within the ROE 130A of wand 125A. By way of another example, according to the example embodiment shown by FIG. 3, the second instructions may indicate to one or more first devices of wand 125B because wand 125B is within the ROE 130A of wand 125A. From the perspective of the wand 125A, the wand 125B is treated as an external device. Thus, wand 125B and the internal components of the wand 125B may be considered to be second device(s) according to the perspective of wand 125A. In each of the aforementioned embodiments, the computing device 105A may transmit the second instructions to the computing device 105B via a network connection and/or a direct wireless connection. The computing device 105B may then transmit the second instructions from computing device 105A to the wand 125B for activation. In some embodiments, the computing device 105B may convert the second instructions from computing device 105A into first instructions for wand 125B such that the second instructions from the computing device 105A appear to be first instructions from the computing device 105B. At operation 1175, the device 101-2 in FIG. 1 (or the wand 125B in FIG. 3) may be activated according to the second instructions. The second instructions may include the spell output intensity level determined at operation 1140. The spell output intensity level may indicate a desired audio output volume and/or duration, a desired video output volume, brightness, and/or duration, a state change level or amount, etc. When the second device 101 is another wand, such as the wand 125B shown in FIG. 3, the second instructions and the spell output intensity level may be the same or similar as the first instructions and spell output intensity level discussed above.

At operation 1170, the computing device 105 may transmit an instruction (also referred to as "third instructions") to adjust or otherwise alter the user profile. At operation 1180, the accounting server 1180 may adjust the user's profile in accordance with the third instructions. In some embodiments, the computing device 105 may update, adjust, and/or alter the user profile, and then transmit the updated user profile to the accounting server 120 to be applied against, or otherwise stored in association with, a game or quest.

It should be noted that according to various embodiments, the operations described above with respect to computing device 105 (e.g., spell determination, spell output intensity determination, position determination, etc.) may be performed by the wand 125, which is shown by the example embodiment of FIG. 2 and discussed in detail with regard to FIG. 9.

FIG. 6 illustrates the components of a wand 125, in accordance with various example embodiments. As shown, the wand 125 includes a wand module 200, a housing 205, and input device 210, and first device 215.

According to various embodiments, the wand module 200 may include the various modules and circuitry to perform various functions according to the example embodiments described herein (see the discussion with regard to FIGS. 1-5 and 7-9). To this end, the wand module 200 may include a communication module (e.g., communications module 330 as shown in FIGS. 7 and 9), one or more memory devices (e.g., memory 350 as shown in FIGS. 7 and 9), one or more processors (e.g., processor 310 as shown in FIGS. 7 and 9), one or more sensors (e.g., sensors 306 as shown in FIGS. 7 and 9), one or more output/feedback devices (e.g., first devices 215 as shown in FIGS. 2, 7, and 9), and/or other like components (e.g., as shown in FIGS. 7 and 9).

According to various embodiments, the housing 205 may be any device or apparatus that is used to physically contain or otherwise include the wand module 200, one or more components of the wand 125 (e.g., input device 210 and/or first device 215). Housing 205 may be manufactured out of various materials and/or fibers, including metal, plastic, glass, rubber, wood, and/or any other like materials that are natural and/or synthetic. In various embodiments, housing 205 may be formed into various sizes and/or shapes based on one or more game design criteria or other like design choices, such as a game type or style, gaming environment or location, user demographics (e.g., age, gender, etc.), environmental conditions in which the wand 125 may be located (e.g., outside vs. inside), and/or other like criterion.

The housing 205 may be shaped, formed, or otherwise implemented as a wand, a scepter, a staff, a baton, a rod, a pen, a sword, a sabre, a screwdriver, a glove, a ring, a bracelet, stuffed or plush toy, a baseball bat, a lacrosse stick, a gun, and/or any other like device that may impart directionality. As shown, housing 205 also includes tip portion 208. In various embodiments, the one or more sensors included in the wand module 200 may be used to determine the directionality of the wand 125 in order to distinguish the tip portion 208 from the other portions of the housing 205. In this way, a user of the wand 125 may experience that "magic" or a spell output may be applied to a device in which the wand is directed by the user (i.e., when the user points the tip portion 208 at the device 101 or other wand 125).

Furthermore, housing 205 may be formed such that one or more auxiliary devices may attach to the housing. In some embodiments, auxiliary devices may attach to housing 205 using one or more attachment components (not shown). The one or more attachment components may include a magnetic component (i.e., any material, or combinations of materials, that attracts other permanent magnetic materials and/or any ferromagnetic materials), an adhesive component (i.e., any substance applied to a surface of at least two materials that binds them together and resists separation), and the like. In various embodiments, the one or more one or more attachment components may include one or more implements, such as hooks, clamps, fasteners, and the like. Furthermore, in some embodiments, the housing 205 may include one or more openings (not shown) configured to receive one or more protrusions of an auxiliary device, or the housing 205 may include one or more protrusions (not shown) configured to be received by one or more openings of an auxiliary device.

According to various example embodiments, the input device 210 may be any physical device that enables a user of the wand 125 to interact with the wand 125. For example, the input device 210 may by a button, a touchscreen device, a biotic sensor, and the like. In some embodiments, the input device 210 may be a peripheral component interface designed to provide interaction between the computing device 105 and one or more peripheral components. User interfaces may include, but are not limited to a physical keyboard or keypad, a touchpad, a speaker, a microphone, infrared heart rate monitoring device, an eye scanning device, a fingerprint or handprint scanning device, an EEG device, haptic feedback devices including one or more actuators and/or one or more TENS devices, etc. Peripheral component interfaces may include, but are not limited to, a non-volatile memory port, a universal serial bus (USB) port, an audio jack, and a power supply interface. It should be noted that input device 210 may be optional, and in various embodiments, the input device 210 may be omitted from the wand 125.

According to various example embodiments, the first device 215 may be any physical device that provides an output or feedback in response to one or more first instructions issued by the wand module 200. The first device 215 may be used to provide feedback or another like indication as to whether a spell has been properly performed or not (within a certain margin of error). As shown, the first device 215 may be an array of LEDs or other like illumination device(s). Although FIG. 2 shows that the first device 215 is located in the tip portion 208, in some embodiments, other portions of the housing 205 may include glowing/illumination devices to provide visual feedback. Additionally, the first device 215 and/or other like illumination devices in housing 205 (not shown) may provide room-level illumination (e.g., a flashlight mode). Furthermore, in various embodiments, the wand module 200 and/or the housing 205 may include one or more first devices 215, such as one or more audio devices, one or more haptic feedback devices or one or more actuators, one or more heating elements, and the like. In some embodiments, the first devices 215 may include a display device and/or a projector.

FIG. 7 illustrates the components of wand module 200, in accordance with various example embodiments. As shown, wand module 200 may include first devices 215, battery 305, sensors 306, input/output (I/O) interface 307, processor 310, device interface module 315, bus 320, I/O bus 325, communication module 330, and memory 350. In some embodiments, computing devices 105 may include many more components than those shown in FIG. 7. However, it is not necessary that all of these generally conventional components be shown in order to disclose the example embodiments.

Memory 350 may be a hardware device configured to store an operating system 360 and program code for one or more software components, such as (optionally) an operating system (not shown), spell module 300, device interface module 315, and/or (optionally) one or more other applications (not shown). Memory 350 may be a computer readable storage medium that generally includes a random access memory (RAM), read only memory (ROM), a flash memory device, a solid state disk (SSD), a secure digital (SD) card, and/or other like storage media capable of storing and recording data. The program code, modules, and/or software components may also be loaded from a separate computer readable storage medium into memory 350 using a drive mechanism (not shown). Such separate computer readable storage medium may include a memory card, memory stick, removable flash drive, sim card, and/or other like computer readable storage medium (not shown).

During operation, memory 350 may include an (optionally) operating system, spell module 300, device interface module 315, and/or (optionally) one or more other applications (not shown). The operating system may manage computer hardware and software resources and provide common services for computer programs. The operating system may include one or more drivers, such as a first devices drivers, sensor drivers, battery drivers, and/or any other like drivers that provide an interface to hardware devices thereby enabling the spell module 300, the device interface module 315, and/or any other applications to access hardware functions without needing to know the details of the hardware itself. The operating system may be a general purpose operating system or an operating system specifically written for and tailored to the wand module 200. In embodiments where the operating system is not present, the device interface module 315 may provide the interface to the various hardware devices of wand module 200.

Device interface module 315 may be one or more software modules configured to interact with the various hardware components of the wand module 200 (e.g., first devices 215, battery 305, sensors 306, and input/output devices via I/O interface 307, etc.). In various embodiments, the device interface module 315 may obtain data from the one or more hardware components (e.g., sensor data), and provide the data to the spell module 300 and/or other applications (not shown) for processing. In various embodiments, the device interface module 315 may obtain first instructions via the communication module 330, and transmit or otherwise issue the first instructions the first instructions to output devices, such as the first devices 215, one or more first devices 215 communicatively connected via the I/O interface, one or more first devices 215 communicatively connected via the communications module 330.

Processor 310 may be configured to carry out instructions of a computer program by performing the basic arithmetical, logical, and input/output operations of the system. The processor 310 may include a single-core processor, a dual-core processor, a triple-core processor, a quad-core processor, one or more digital signal processors (DSPs), application-specific-integrated-circuits, field programmable gate arrays (FPGAs), and/or the like. The processor 310 may perform a variety of functions for the wand 125 and may process data by executing program code, one or more software modules, firmware, middleware, microcode, hardware description languages, and/or any other like set of instructions stored in the memory 350. The program code may be provided to processor 310 by memory 350 via bus 320, one or more drive mechanisms (not shown), and/or via communication module 330. In order to perform the variety of functions and data processing operations, the program code, modules, and/or software components may be executed by the processor 310. On execution by the processor 310, the processor 310 may cause wand module 200 to perform the various operations and functions delineated by the program code, modules, and/or software components.

For example, in various embodiments, the wand module 200 may include various modules configured to operate (through hardware and/or software) to obtain, from the sensors 306, sensor data that is indicative of one or more gestures performed using the wand 125, and generate or otherwise determine a spell sequence based on the sensor data as described herein. The one or more modules may include the spell module 300 and the device interface module 315. The various modules may be loaded into the memory 350 and executed by the processor 310. Once the various modules are loaded into memory 350 and executed by the processor 310, the processor 310 may be configured to cause wand module 200 to control the sensors 306 to determine or detect various gestures, wand positions and/or wand orientations, and the like; receive or obtain from the device interface module 315, via the sensors 306, the sensor data representative of the gestures; convert the sensor data representative of the one or more gestures into a spell sequence; provide the spell sequence to the communication module 330 to transmit the spell sequence to a computing device 105; and issue first instructions to the first devices 215 based on a spell output received from the computing device 105 via the communication module 330. In various embodiments, converting the sensor data into a spell sequence may include converting the one or more spatial coordinates (or spatial coordinate changes) into a markup language, a hypertext language, a text file, firmware, middleware, microcode, hardware description language, or any combination thereof that may be executed or otherwise interpreted by the processor 410 of the computing device 105 (see e.g., description of FIG. 8) or processor 310 of the wand module 200 (see e.g., description of FIG. 9). While specific modules are described herein, it should be recognized that, in various embodiments, various modules may be combined, separated into separate modules, and/or omitted.

Bus 320 may be configured to enable the communication and data transfer between the processor 310 and memory 350. Bus 320 may comprise a high-speed serial bus, parallel bus, internal universal serial bus (USB), Front-Side-Bus (FSB), and/or other suitable communication technology for transferring data between components within wand module 200 and/or between wand module 200 and other like devices. I/O bus 325 may be configured to enable the communication and data transfer between the components of wand module 200. In various embodiments, the I/O bus 325 may be the same or similar as bus 320, while in some embodiments, I/O bus 325 may comprise a PCI bus, a PCI-Express (PCI-e) bus, a Small Computer System Interface (SCSI) bus, and the like.

Communication module 330 may be a computer hardware component that connects wand module 200 to a computing device 105 via a direct wireless connection and/or via a computer network (e.g., network 115). Communication module 330 may connect with one or more devices via the direct wireless connection by using, for example, Bluetooth and/or BLE protocols, WiFi protocols, IrDA protocols, ANT and/or ANT+ protocols, 3GPP LTE ProSe protocols, and the like. In some embodiments, communication module 330 may connect the wand module 200 with one or more devices (e.g., devices 101 and/or computing device 105) via network 115 in accordance with one or more wireless communications protocols and/or one or more cellular phone communications protocols. In such embodiments, communication module 330 may be configured to operate in accordance with the (GSM, EDGE, WCDMA, CDMA, TDMA, Bluetooth, Wi-Fi such as IEEE 802.11a, IEEE 802.11b, IEEE 802.11g, IEEE 802.11ac, and/or IEEE 802.11n, VoIP, WiMAX, LTE, and/or any other "wireless" communication protocols. Communication module 330 may operate in conjunction with a wireless transmitter/receiver and/or transceiver (not shown) that is configured to operate in accordance with one or more wireless standards described above. The communication module 330 may also include one or more network interfaces, one or more virtual network interfaces configured to operate with spell module 300 and/or other like modules or applications.

First devices 215 may be physical hardware devices configured to provide feedback or another like indication as to whether a spell has been properly performed or not. As shown, the first device 215 may be one or more LEDs or other like illumination device. In various embodiments, the one or more first devices 215 may include one or more audio devices, one or more haptic feedback devices and/or one or more actuators, one or more heating elements, and the like. In some embodiments, the first devices 215 may include a display device and/or a projector.

I/O interface 307 may be a computer hardware component that provides communication between the wand module 200 and one or more other devices. The I/O interface 307 may include one or more user interfaces designed to enable user interaction with the wand module 200 and/or peripheral component interfaces designed to provide interaction between the computing device 105 and one or more peripheral components. User interfaces may include, but are not limited to a physical keyboard or keypad, a touchpad, a speaker, a microphone, infrared heart rate monitoring device, a fingerprint or handprint scanning device, an EEG device, haptic feedback devices including one or more actuators and/or one or more TENS devices, etc. Peripheral component interfaces may include, but are not limited to, a non-volatile memory port, a universal serial bus (USB) port, an audio jack, and a power supply interface. It should be noted that the I/O interface 307 may be an optional element, and thus, in some embodiments the I/O interface 307 may be omitted from the wand module 300.

Sensors 306 may include one or more sensing devices to determine position information (or alternatively "position data"), orientation information (or alternatively "orientation data"), environmental conditions, and/or like information related to the wand module 200. In some embodiments, the sensors 306 may include, but are not limited to, an accelerometer, gyroscope, gravimeter, magnetometer, proximity sensor, ambient light sensor, and a positioning unit, such as GPS circuitry, and the like.

Battery 305 may be a device configured to provide electrical power to the wand module 200 using one or more electrochemical cells including nickel-cadmium (NiCd), nickel-zinc (NiZn), nickel metal hydride (NiMH), and lithium-ion (Li-ion) cells. In some embodiments battery 305 may comprise a supercapacitor device and/or an ultracapacitor device, while in other embodiments, the battery 305 may comprise a fuel cell device. The battery 305 may communicate battery information to the device interface module 315 when queried by the device interface module 315. The battery information may indicate whether the wand module 200 is connected to a power source, whether the connected power sources is wired or wireless, whether the connected power sources is an alternating current charger or a USB charger, a current voltage of the battery, a remaining battery capacity as an integer percentage of total capacity (with or without a fractional part), a battery capacity in microampere-hours, an average battery current in microamperes, an instantaneous battery current in microamperes, a remaining energy in nanowatt-hours, whether the battery is overheated, cold, dead, or has an unspecified failure, and the like. The device interface module 315 may provide the battery information to the spell module 300 and/or the wand communication module 330 to provide the battery information to the computing device 105 to determine the spell output intensity based on the amount of charge indicated by the battery information.

Figure 8:
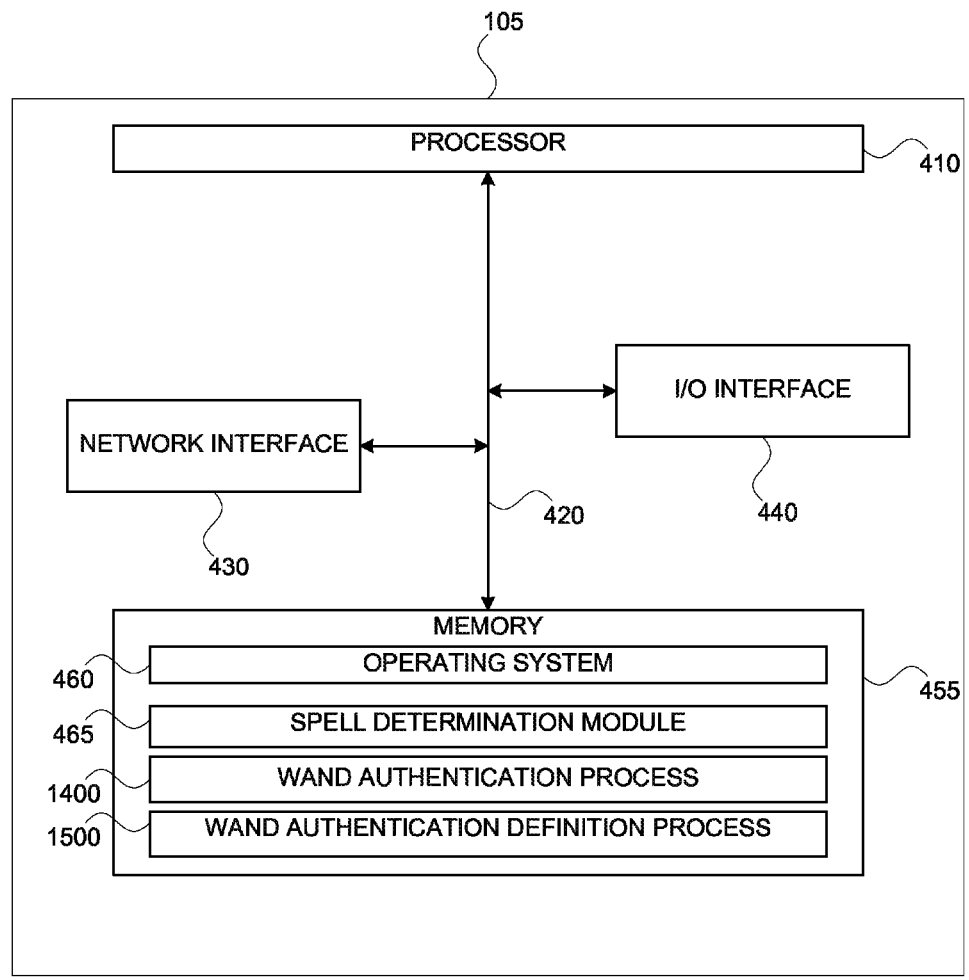
FIG. 8 illustrates the components of a computing device, in accordance with various example embodiments.

FIG. 8 illustrates the components of the computing devices 105, in accordance with various example embodiments. As shown, computing devices 105 may include processor 410, bus 420, network interface 430, input/output (I/O) interface 440, and memory 350. In some embodiments, computing devices 105 may include many more components than those shown in FIG. 8, such as a display device, an input device (e.g., a physical keyboard, a touch screen, etc.), one or more image sensors, a transmitter/receiver (or alternatively, a transceiver), a mobile video card and/or graphics processing unit (GPU), and other like components. However, it is not necessary that all of these generally conventional components be shown in order to disclose the example embodiments.

Memory 450 may be a hardware device configured to store an operating system 460 and program code for one or more software components, such as spell determination module 465 and/or one or more applications 465, 1400, and 1500. Memory 450 may be a computer readable storage medium that generally includes RAM, ROM, a flash memory device, a SSD, a SD card, and/or other like storage media capable of storing and recording data. The program code and/or software components may also be loaded from a separate computer readable storage medium into memory 450 using a drive mechanism (not shown). Such separate computer readable storage medium may include a memory card, memory stick, removable flash drive, sim card, and/or other like computer readable storage medium (not shown). In some embodiments, software components may be loaded into memory 450 via network interface 430, rather than via a computer readable storage medium.

During operation, memory 450 may include operating system 460, spell determination module 465, which includes wand authentication process 1400, wand authentication definition process 1500, and/or any other like processes (not shown). Operating system 460 may manage computer hardware and software resources and provide common services for computer programs. Operating system 460 may include one or more drivers, such as a display driver, camera driver, audio drivers, and/or any other like drivers that provide an interface to hardware devices thereby enabling operating system 460, spell determination module 465, wand authentication process 1400, and wand authentication definition process 1500 to access hardware functions without needing to know the details of the hardware itself. The operating system 460 may be a general purpose operating system or an operating system specifically written for and tailored to the computing device 105.

The spell determination module 465 may be a collection of software modules and/or program code that enables the computing devices 105 to define one or more spells with associated spell outputs, determine when a spell has been performed using the wand 125, and determine spell outputs associated with a performed spell. Spell determination module 465 may be a native application, a web application, or a hybrid application. In embodiments where the spell determination module 465 is a web or hybrid application, spell determination module 465 may be rendered in or otherwise executed using a web browser of the computing device 105. In various embodiments, a game operator may develop one or more other applications to interact with the spell determination module 465. The aforementioned processes may be a collection of software modules and/or program code that enables the computing device 105 to operate according to the various example embodiments as discussed with regard to FIGS. 10-11.

Processor 410 may be configured to carry out instructions of a computer program by performing the basic arithmetical, logical, and input/output operations of the system. The processor 410 may include a single-core processor, a dual-core processor, a triple-core processor, a quad-core processor, and/or the like. The processor 410 may perform a variety of functions for the computing devices 105 and may process data by executing program code, one or more software modules, firmware, middleware, microcode, hardware description languages, and/or any other like set of instructions stored in the memory 450. The program code may be provided to processor 410 by memory 450 via bus 420, one or more drive mechanisms (not shown), and/or via network interface 430. In order to perform the variety of functions and data processing operations, the program code and/or software components may be executed by the processor 410. On execution by the processor 410, the processor 410 may cause computing devices 105 to perform the various operations and functions delineated by the program code/modules, and/or software components.

For example, in various embodiments, the computing devices 105 may include various modules configured to operate (through hardware and/or software) to define one or more spells with associated spell outputs, and determine when a spell has been performed using the wand 125. The various modules may include the spell determination module 465 and modules corresponding to the processes 1400 and 1500 (described with regard to FIGS. 10-11). The various modules may be loaded into memory 450 and executed by the processor 410. Once the various modules are loaded into memory 450 and executed by the processor 410, the processor 310 may be configured to perform the processes 1400 and 1500 as discussed with regard to FIGS. 10-11. While specific modules are described herein, it should be recognized that, in various embodiments, various modules and/or processes may be combined, separated into separate modules and/or processes, and/or omitted. Additionally, in various embodiments, one or more modules and/or processes may be implemented on separate devices, in separate locations, or distributed, individually or in sets, across multiple processors, devices, locations, and/or in cloud-computing implementations.

Bus 420 may be configured to enable the communication and data transfer between the components of computing device 105. Bus 420 may comprise a high-speed serial bus, parallel bus, internal USB, FSB, and/or other suitable communication technology for transferring data between components within computing device 105 and/or between computing device 105 and other like devices. In some embodiments, the computing device 105 may include an I/O bus such as a PCI bus, a (PCI-e bus, a SCSI bus, and the like.

Network interface 430 may be a computer hardware component that connects computing device 105 to a computer network (e.g., network 115). Network interface 430 may connect computing device 105 to a computer network via a wired or wireless connection. Network interface 430 may operate in conjunction with a wireless transmitter/receiver and/or transceiver (not shown) that is configured to operate in accordance with one or more wireless standards. The wireless transmitter/receiver and/or transceiver may be configured to operate in accordance with a wireless communications standard, such as the IEEE 802.11-2007 standard (802.11), the Bluetooth standard, and/or any other like wireless standards. The communications port may be configured to operate in accordance with a wired communications protocol, such as a serial communications protocol (e.g., the USB, FireWire, SDI, and/or other like serial communications protocols), a parallel communications protocol (e.g., IEEE 1284, CAMAC, and/or other like parallel communications protocols), and/or a network communications protocol (e.g., Ethernet, token ring, (FDDI, and/or other like network communications protocols). The network interface 430 may also include one or more virtual network interfaces configured to operate with application 465 and/or other like applications.

I/O interface 440 may be a computer hardware component that provides communication between the computing device 105 and one or more other devices. The I/O interface 440 may include one or more user interfaces designed to enable user interaction with the computing device 105 and/or peripheral component interfaces designed to provide interaction between the computing device 105 and one or more peripheral components. User interfaces may include, but are not limited to a physical keyboard or keypad, a touchpad, a speaker, a microphone, etc. Peripheral component interfaces may include, but are not limited to, a non-volatile memory port, a USB port, an audio jack, and a power supply interface.

As discussed above, computing devices 105 may also include a transmitter and receiver or a transceiver (not shown). The transmitter may be any type of hardware device that generates or otherwise produces radio waves in order to communicate with one or more other devices. The transmitter may be coupled with an antenna (not shown) in order to transmit data to one or more other devices. The transmitter may be configured to receive digital data from one or more components of computing devices 105 via bus 420, and convert the received digital data into an analog signal for transmission over an air interface. The receiver may be any type of hardware device that can receive and convert a signal from a modulated radio wave into usable information, such as digital data. The receiver may be coupled with the antenna (not shown) in order to capture radio waves. The receiver may be configured to send digital data converted from a captured radio wave to one or more other components of computing device 105 via bus 420. In embodiments where a transceiver (not shown) is included with computing devices 105, the transceiver may be a single component configured to provide the functionality of a transmitter and a receiver as discussed above.

FIG. 9 illustrates the components of wand module 200, in accordance with other various example embodiments. As shown, wand module 200 may include first devices 215, battery 305, sensors 306, I/O interface 307, processor 310, device interface module 315, bus 320, I/O bus 325, communication module 330, and memory 350. Furthermore, during operation, the wand module 200 of FIG. 9 includes the device interface module 315 and spell module 300, which includes the spell determination module 465, which includes the processes 400-600. In some embodiments, wand module 200 may include many more components than those shown in FIG. 9. However, it is not necessary that all of these generally conventional components be shown in order to disclose the example embodiments. FIG. 9 illustrates the internal components of wand module 200 that is capable of performing the various spell definition and spell determination processes as described above as being performed by the computing device 105 (see e.g., the description of FIGS. 1-5). Thus, the various components as described above with regard to FIGS. 7-8 may be the same or similar to those shown in FIG. 9.

Figure 10:
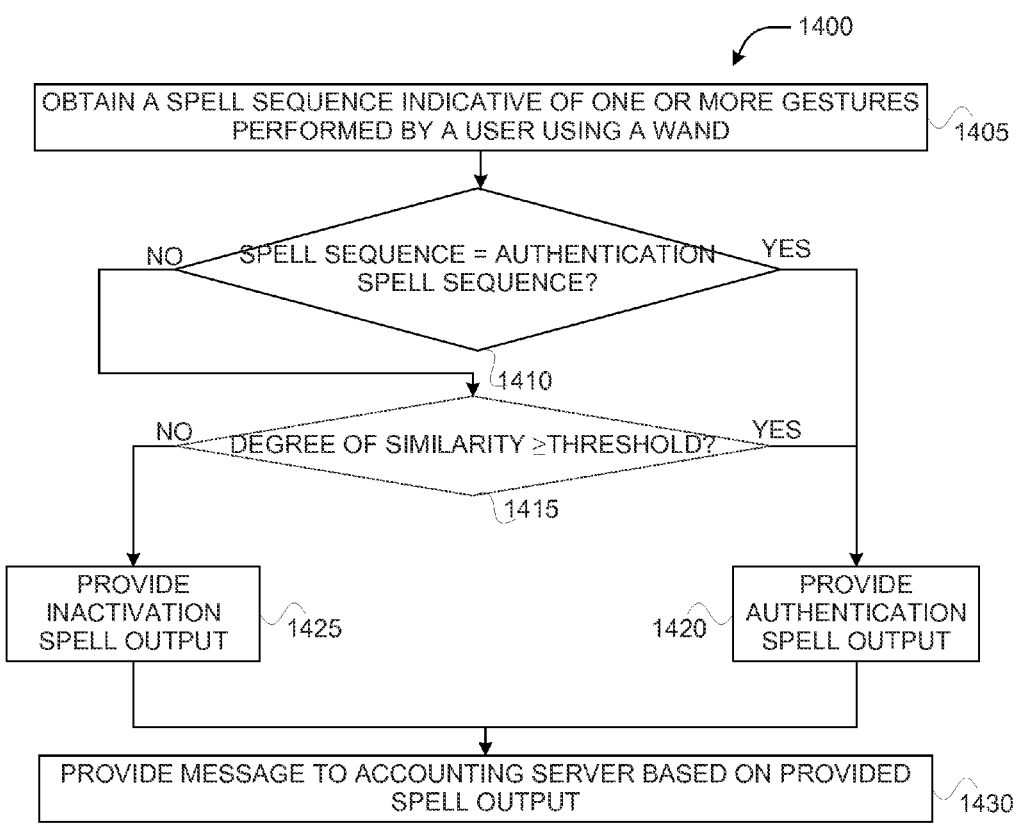
FIG. 10 illustrates a process for authenticating a wand user's identity, in accordance with various embodiments.

FIG. 10 illustrates a process 1400 for authenticating a user of wand in accordance with various embodiments. The process 1400 may be implemented as part of wand module 200 or one or more applications including software modules or program code, which may be executed by a processor of computing device 105. For illustrative purposes, the operations of processes 1400-1500 will be described as being performed by a computing device 105 in conjunction with a wand 125 wherein a user of the computing device 105 and/or the wand 125 may be referred to as a "wand user." However, it should be noted that a wand 125 (e.g., the example embodiments shown and discussed with regard to FIG. 9) and/or any other similar devices may operate the process 1400 as described below. While particular examples and orders of operations are illustrated in FIG. 10, in various embodiments, these operations may be re-ordered, broken into additional operations, combined, and/or omitted altogether.

At operation 1405, the computing device 105 may obtain a spell sequence indicative of one or more performed gestures wherein the one or more performed gestures are movements performed by a user using the wand 125A. The computing device 105 may obtain or otherwise determine the spell sequence indicative of one or more performed gestures according the various methods described herein. In most embodiments, the one or more gestures may include one or more bodily movements, one or more button presses, one or more voice commands, various biometric data, and the like.

At operation 1410, the computing device 105 may determine whether the spell sequence matches a defined authentication spell sequence. In some embodiments, the computing device 105 may determine if the spell sequence matches any authentication spell sequence of a plurality of spell sequences. In such embodiments, each of the plurality of authentication spell sequences may be associated with a different game or activity. In some embodiments, each of the plurality of authentication spell sequences may be associated with a different wand user.

It should be noted that in some embodiments, the authentication spell may require one or more gestures to be performed by one or more other users using one or more other wands 125. In such embodiments, when the computing device 105 receives a spell sequence indicative of one or more gestures, the computing device 105 may track timing information (e.g., a time of day, a period of time in which the spell was performed, and the like) of the spell sequence. Once the computing device 105 at operations 1410 and/or 1415 determines that received spell sequence is an authentication spell, the computing device 105 may include the authentication spell and the associated timing information in an quest authentication spell message to be sent to the other devices, such as wand 125B and/or the computing device 105B. Similarly, the wand 125A and/or the computing device 105A may receive an authentication spell message from the computing device 105B, which may include another authentication spell performed by the wand 125B and associated timing information. Once the authentication spell messages are communicated, the computing device 105A may determine whether an authentication spell has been performed by the other wand user. In various embodiments, the other wand user may be required to perform the same or similar authentication spell that was performed by the user of wand 125A. In some embodiments, the computing device 105A may determine whether the same or similar authentication spells were performed by both users at a same or similar time. In such embodiments, the computing device 105A may compare the authentication spell and the associated timing information with the information contained in the other authentication spell message.

For example, a spell may include the quest participants holding their wands 125 in their hands and extending their arm straight upwards while facing each other at a same or similar time, and also issuing a voice command while the wands 215 are held over each wand user's head. In such embodiments, the computing device 105A may receive a spell sequence indicative of the bodily motions and issued voice command, and may determine timing information of the spell sequence indicative of the aforementioned gestures. The computing device 105A may determine that the aforementioned gestures are an authentication spell. The computing device 105A may obtain an authentication spell message from the other wand 125B, which may indicate another authentication spell performed using the other wand 125B and timing information associated with the other quest initiation spell. The computing device 105A may determine whether the other authentication spell is indicative of the same or similar gestures that were performed at a same or similar time as the authentication spell performed using the wand 125A.

By way of another example, the authentication spell may include clanking the wands 125A and 125B together, wherein vibrations generated by the contact of the wand 125A and 125B may be interpreted as authentication spell messages. In such embodiments, wand 125A may contact or touch wand 125B, and the wands 125A and 125B may register a same or similar vibration at a same or similar time.

Referring back to FIG. 10, if at operation 1410, the computing device 105 determines that the spell sequence matches a defined authentication spell sequences, then the computing device 105 may proceed to operation 1420 to provide an authentication spell output. If at operation 1410, the computing device 105 determines that the spell sequence does not match a defined authentication spell sequence, then the computing device 105 may proceed to operation 1418 to determine whether a degree of similarity is greater than or equal to a threshold.

At operation 1415, the computing device 105 may determine whether a degree of similarity is greater than or equal to a threshold (also referred to as a "threshold degree of similarity"). The degree of similarity may indicate a number and/or order of operations of the spell sequence that matches a number and order of operations of the defined spell sequence. For example, if a defined spell sequence requires a user to perform desired number of gestures in a specific sequence, and the user performs one or fewer (or one or more) of the defined gestures, the degree of similarity may be represented as a character or integer indicating the amount of the gestures that were performed. In some embodiments, the degree of similarity may be represented as a ratio of the number of performed gestures to the number of defined gestures. In some embodiments, the degree of similarity may indicate whether one or more gestures were performed out of order. In various embodiments, the threshold may be a desired or predetermined number and/or sequence of gestures set according to one or more game design choices. If at operation 1415, the computing device 105 determines that the degree of similarity is less than the threshold, then the computing device 105 may proceed to operation 1425 to provide an inactivation spell output. If at operation 1415, the computing device 105 determines that the degree of similarity is greater than or equal to a threshold, then the computing device 105 may proceed to operation 1420 to determine provide an authentication spell output.

At operation 1420, the computing device 105 may provide an authentication spell output. The authentication spell output may include one or more first instructions for activation one or more first devices 215 of the wand 125, and/or may include one or more second instructions for activation one or more second devices that are communicatively coupled with the wand 125 and/or the computing device 105. At operation 1425, the computing device 105 may provide an inactivation spell output. The inactivation spell output may include one or more first instructions for activation one or more first devices 215 of the wand 125, and/or may include one or more second instructions for activation one or more second devices that are communicatively coupled with the wand 125 and/or the computing device 105. The authentication spell output and the inactivation spell output are described in detail with regard to operation 1515 of process 1500. At operation 1430, the computing device 105 may provide a message to the accounting server 120 based on the provided spell output. Such a message may indicate to the accounting server 120 that the wand 125 was authenticated and/or inactivated.

Figure 11:
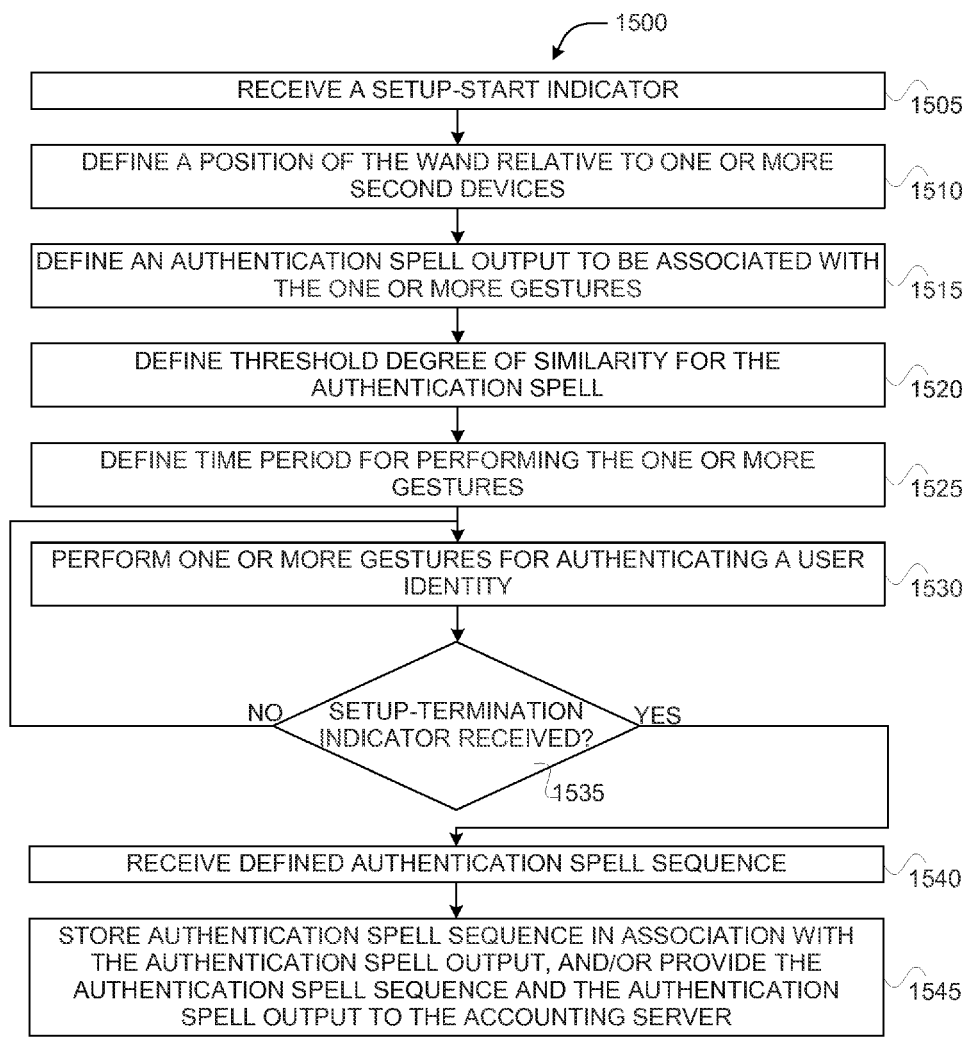
FIG. 11 illustrates a process for defining a wand authentication spell, in accordance with various embodiments.

FIG. 11 illustrates a process 1500 for defining an authentication spell for authenticating a user of wand in accordance with various embodiments. The process 1500 may be implemented as part of wand module 200 or one or more applications including software modules or program code, which may be executed by a processor of computing device 105. For illustrative purposes, the operations of process 1500 will be described as being performed by a computing device 105 in conjunction with a wand 125 wherein a user of the computing device 105 and/or the wand 125 may be referred to as a "wand user." However, it should be noted that a wand 125 (e.g., the example embodiments shown and discussed with regard to FIG. 9) and/or any other similar devices may operate the process 1400 as described below. While particular examples and orders of operations are illustrated in FIG. 10, in various embodiments, these operations may be re-ordered, broken into additional operations, combined, and/or omitted altogether.

At operation 1505, the computing device 105 may receive a setup-start indicator. In some embodiments, the setup-start indicator may be received from an accounting server 120. The setup-start indicator may be provided to the computing device 105 during a registration period for a wand 125. The registration period may be initiated during an initial setup of the wand 125 (e.g., shortly after purchasing the wand 125 and turning the wand 125 on for the first time) or a setup for a specific game or activity (e.g., setting up the wand 125 for a quest type game provided by a first game operator, setting up the wand 125 for an arena-based duel game provided by a second game operator, etc.). The setup-start indicator may be received by the computing device 105 in response to a triggering event. In embodiments where the accounting server 120 provides the setup-start indicator, the triggering event may include completion of an online registration/signup process via a website provided by the accounting server 120 and/or another like entity. In other embodiments, the triggering event could include the reception of a signal from a device 101 (e.g., an auxiliary device) that contains the setup-start indicator in one or more data packets. In other embodiments the computing device 105 may generate the setup-start indicator. In such embodiments, the setup-start indicator may be generated in response to receiving an input indicating to start the registration period. Such an input may be received upon completion of a setup application being executed by the computing device 105, upon receiving a spell sequence from the wand 125, and the like.

In most embodiments, once the setup-start indicator is received by the computing device 105 or generated by the computing device 105, the computing device 105 may provide the setup-start indicator to the wand 125. In such embodiments, the setup-start indicator may include one or more first instructions to activate one or more first devices of the wand 125 and/or one or more second instructions to activate one or more second devices communicatively coupled with the wand 125. These first instructions and/or second instructions may be used to indicate to the wand user that the wand user may begin performing the various operations discussed below. However, it should be noted that the setup-start indicator may be provided to the wand 125 at different points during the process 1500 depending on which operations are performed using the wand 125 or the computing device 105. For example, in embodiments where operations 1510-1525 are performed using the computing device 105, then the setup-start indicator may be provided to the wand 125 after operation 1525 and/or before operation 1530 to indicate to the user to perform the one or more gestures for authenticating the user identity. In such embodiments, a user registration application executed by the computing device 105 may be used to perform operations 1510-1525. In embodiments where operations 1510-1530 are performed using the wand 125, then the setup-start indicator may be provided to the wand 125 before operation 1510 to indicate to the wand user to begin defining a position of the wand 125 relative to one or more second devices.

At operation 1510, the computing device 105 may define a position of the wand 125 relative to one or more second devices. In some embodiments, the one or more second devices may include an auxiliary device that is required to be proximate to the wand 125 for authenticating the wand user's identity. For example, the auxiliary device may be a medallion that is required to be worn by the wand user while performing the authentication spell. Continuing with the aforementioned example, the wand user may be required to wear the medallion while defining the one or more gestures for authenticating the user identity at operation 1530. In some embodiments, the one or more second devices may include an IoT device that is required to be proximate to the wand 125 for authenticating the wand user's identity. For example, the IoT device may be an electro-mechanical device that opens a door to a gaming environment (e.g., an arena, an amusement park ride, a museum, a shopping mall, and the like) wherein the wand user is required to be within five feet of the IoT device while performing an authentication spell that is specific to the gaming environment. Continuing with the aforementioned example, the wand user may be required to stand five feet from the IoT device (within some margin of error) while defining the one or more gestures for authenticating the user identity at operation 1530. In other embodiments, instead of (or in addition to) requiring the wand 125 to be proximate to a second device, at operation 1510 the computing device 105 may define a desired geolocation or desired position within a predefined venue where the wand user is required to be perform the authentication spell (e.g., at an entrance or within an arena, at an entrance to an amusement park ride, at an entrance or within a museum, at an entrance or within a shopping mall, and the like). Such a geolocation or position may be determined according to the various example embodiments discussed herein. It should be noted that in some embodiments, a wand user may be required to physically move to the desired geolocation and/or venue, and perform the one or more gestures using the wand 125 to define the one or more gestures (discussed with regard to operation 1530).

At operation 1515, the computing device 105 may define an authentication spell output to be associated with the one or more gestures. The defined authentication spell output may include one or more first instructions for activating one or more first devices and/or one or more second instructions for activating or accessing the one or more second devices. The first instructions and/or the second instructions may provide an indication that the wand user's identity has been authenticated and/or that the wand 125 may be used for a game or activity. For example, upon performance of a defined authentication spell for a wand duel game, a first instruction may activate an audio device of the wand 125 to play a prerecorded message stating "power up!" for the wand duel game. By way of another example, upon performance of a defined authentication spell for a quest game, a second instruction may activate a display device to display a desired image or text stating "begin quest" indicating to the wand user to begin discovering items or caches in the quest type game. Once defined, the authentication spell output may then be associated with the one or more gestures defined at operation 1530 and/or a wand position relative to each of the one or more second devices defined at operation 1510.

Optionally, the computing device 105 may define inactivation spell output to be associated with the defined authentication spell, which may include one or more inactivation first instructions for activating one or more first devices and/or one or more inactivation second instructions for activating one or more second devices, wherein the one or more authentication first instructions are different than the one or more inactivation first instructions and/or the one or more authentication second instructions are different than the one or more inactivation second instructions. The inactivation spell output may be used to indicate to a user of the wand 125 that the one or more defined gestures for authenticating the wand user's identity have not been performed properly and/or that a degree of similarity between such defined gestures and the performed gestures is below a threshold degree of similarity. For example, such inactivation first instructions and/or inactivation second instructions may provide an audio or text-based message stating that the wand user's identity was not authenticated. In some embodiments, the inactivation first instructions may deactivate and/or disable the wand 125 by shutting down one or more internal components of the wand 125, such as by instructing the battery 305 to reduce or cutoff power to the wand 125, erasing memory 350, and/or the like. In some embodiments, the inactivation spell output may be associated with an instruction that may be sent to the accounting server 120 to indicate that the wand 125 has been disabled or otherwise inactivated.

At operation 1520, the computing device 105 may define threshold degree of similarity for the authentication spell. As noted previously, the degree of similarity may indicate a number and/or order of operations of the spell sequence that matches a number and order of operations of the defined spell sequence, which may be represented as a character or integer indicating the amount of the gestures that were performed. At operation 1520, the computing device 105 may specify or define a minimum number and/or order of operations of the authentication spell (or authentication spell sequence) that are required to be performed to obtain the authentication spell output associated with the authentication spell.

At operation 1525, the computing device 105 may define a time period (also referred to as a "period of time") for performing the one or more gestures. The time period may be an amount of time in which the wand user is to perform the one or more defined gestures for authenticating the wand user's identity. For example, the wand user may be required to perform three different bodily movements and recite a voice command within 20 seconds. The time period may also include a timer that each gesture has to be performed after completing a previous gesture. Continuing with the previous example, the wand user may be required to perform each of the three different bodily movements within 200 milliseconds of each other and recite a voice command within 500 milliseconds after performing the last of the three bodily movements. It should be noted that each defined authentication spell may have a different time period for performing corresponding gestures. For example, a first authentication spell may require the wand user to perform three different bodily movements and recite a voice command within 20 seconds, while a second authentication spell may require the wand user to perform five bodily movements within 15 seconds. In some embodiments, the time period may be a time in which one or more defined gestures are required to be performed (within a certain margin of error) to access or activate the one or more second devices. For example, the time period may specify that an IoT device must be activated within 2 minutes of performing a first gesture of a defined authentication spell. In such embodiments, the time period may take into account a time required for a second device to perform one or more operations. For example, when the second device to be activated is a display device, the first time period may take into account an amount of time required to receive a second instruction, transition from a sleep/idle mode to an active mode (if necessary), and display a defined image or text. By way of another example, when the second device to be activated is drone or IoT device, the first time period may take into account an amount of time required to receive a second instruction, transition from a sleep/idle mode to an active mode (if necessary), engage or activate one or more electro-mechanical components, and move to a predefined location or position (if necessary).

At operation 1530, the computing device 105 may perform one or more gestures for authentication a user identity. As noted previously, the one or more gestures may include one or more bodily movements, one or more physical inputs (e.g., button presses, biometric data, etc.), one or more voice commands, completion of one or more tasks, and the like. Defining the one or more gestures may also include defining a sequence in which the one or more gestures are required to be performed. For authentication spells requiring the wand 125 to be proximate to one or more second devices, the wand user may be required to perform the one or more gestures at a desired position from such second devices, such as wearing a medallion auxiliary device while performing the one or more gestures, standing at a desired distance from an IoT device, etc.

At operation 1535, the computing device 105 may determine whether a setup-termination indicator has been received. The setup-termination indicator may indicate that the registration period has ended or terminated. The setup-termination indicator may be provided to the computing device 105 or generated by the computing device 105. In some embodiments, a timer or counter may be associated with the registration period, which may be used to limit an amount of time that the wand user may have to define to the one or more gestures at operation 1530.

When the timer (or counter) is executed by the computing device 105, upon expiration of the timer (or upon reaching a predetermined counter value), the computing device 105 may generate the setup-termination indicator and provide the setup-termination indicator to the wand 125. When the timer (or counter) is executed by the accounting server 120, upon expiration of the timer (or upon reaching a predetermined counter value), the computing device 105 may receive the setup-termination indicator from the accounting server 120 and provide the setup-termination indicator to the wand 125. In some embodiments, the accounting server 120 may provide the setup-termination indicator to the wand 125 without being passed to the computing device 105. In such embodiments, reception of an authentication spell sequence from the wand 125 (discussed with regard to operation 1540) may indicate to the computing device 105 that the registration period has ended.

In some embodiments, instead of using a timer or counter, a predetermined gesture may be used to indicate termination of the registration period, which may be referred to as a "termination gesture." In such embodiments, the wand user may perform one or more gestures for defining the authentication spell sequence (operation 1530) and then perform the termination gesture. The wand 125 may then generate the authentication spell sequence and append the termination gesture to the end of the authentication spell sequence. The computing device 105 may receive the generated authentication spell sequence from the wand 125 (discussed with regard to operation 1540), and upon detection of the termination gesture in the authentication spell sequence, the computing device 105 may generate and send the setup-termination indicator to the wand 125. It should be noted that the computing device 105 may delete or otherwise exclude the termination gesture from the authentication spell sequence prior to storing the authentication spell sequence or providing the authentication spell sequence to the accounting server 120 (discussed with regard to operation 1545).

In most embodiments, once the setup-termination indicator is received by the computing device 105 or generated by the computing device 105, the computing device 105 may provide the setup-termination indicator to the wand 125. In such embodiments, the setup-termination indicator may include one or more first instructions to activate one or more first devices of the wand 125 and/or one or more second instructions to activate one or more second devices communicatively coupled with the wand 125. These first instructions and/or second instructions may be used to indicate to the wand user that the has ended or terminated according to the examples provided previously.

Referring back to FIG. 11, if at operation 1535 the computing device 105 has not received the setup-termination indicator, then the computing device 105 may proceed to operation 1535 to continue performing the one or more gestures. If at operation 1535 the computing device 105 has received the setup-termination indicator, then the computing device 105 may proceed to operation 1540 to generate an authentication spell sequence.

At operation 1540, the computing device 105 may receive the defined authentication spell sequence. At operation 1545, the computing device 105 may store the authentication spell sequence in association with the authentication spell output, and/or provide the authentication spell sequence and the authentication spell output to the accounting server 120.

In various embodiments, the spell module 300 of the wand 125 may generate the defined authentication spell sequence and provide the defined authentication spell sequence to the computing device 105. Generating the defined authentication spell sequence may include converting the one or more defined gestures into a markup language, a hypertext language, a text file, firmware, middleware, microcode, hardware description languages, or any combination thereof that may be executed or otherwise interpreted by the computing device 105. In embodiments, the operations 1510-1525 may be defined by performing one or more other gestures at the desired position to indicate a desired spell output, desired threshold degree of similarity within a desired period of time. In such embodiments, the generated authentication spell sequence may include associated defined position information, a defined spell output, a defined threshold degree of similarity, and/or a defined period of time. In other embodiments, the operations 1510-1525 may be defined using a web application or webpage for defining the authentication spell according to the various example embodiments disclosed herein. Such a web application or webpage may include one or more graphical control elements that allow a user of the computing device 105 to perform one or more of the operations 1510-1525. The graphical control elements may include radio boxes, check boxes, text fields, and in some embodiments, markers to be placed on an interactive map when the authentication spell is required to be performed at a desired location. In such embodiments, the computing device 105 may store the generated authentication spell sequence in association with defined position information, a defined spell output, a defined threshold degree of similarity, and/or a defined period of time. The computing device 105 may then provide the defined authentication spell, defined position information, defined spell output, defined threshold degree of similarity, and defined period of time to the accounting server 120 to be stored in an authentication spell database as discussed previously. In addition to (or alternative to) providing the aforementioned information to the accounting server 120, the computing device 105 may store the aforementioned information to a local storage device (e.g., memory 350, memory 450, etc.).

As described herein, the example embodiments provide apparatuses, systems, and methods for providing immersive interactive gaming experiences using a handheld user interface device. Example embodiments provide that the handheld user interface devices may utilize already existing/deployed output devices and/or already existing gaming platforms to provide gaming feedback to a user. Thus, the described embodiments are not tied to a specific proprietary platform and/or a specific physical/virtual environment.

Some non-limiting Examples are provided below.

Example 1 may include a wand comprising one or more sensors, communicatively coupled with at least one processor, to detect one or more gestures wherein the one or more gestures are movements performed using the wand by a user of the wand, and generate sensor data representative of the one or more gestures; a device interface module to operate on the at least one processor to obtain, from the one or more sensors, the generated sensor data representative of the one or more gestures; a spell module to operate on the at least one processor to receive, from the device interface module, the obtained sensor data representative of the one or more gestures, and convert the obtained sensor data representative of the one or more gestures into a spell sequence; and a wand communication module, communicatively coupled with the at least one processor, to transmit the spell sequence to a computing device, and receive, from the computing device, one of an authentication spell output when the spell sequence corresponds with an authentication spell sequence or an inactivation spell output when the spell sequence does not correspond with the authentication spell sequence.

Example 2 may include the wand of example 1 and/or any other one or more examples disclosed herein, wherein when the spell sequence matches the authentication spell sequence, the spell module is to transmit an authentication first instruction to the device interface module to activate one or more first devices according to the authentication spell output; and when the spell sequence does not match the authentication spell sequence, the spell module is to transmit an inactivation first instruction to the device interface module to activate the one or more first devices according to the inactivation spell output.

Example 3. The wand of any of examples 1 or 2 and/or any other one or more examples disclosed herein, wherein the authentication spell is assigned to the user via an accounting server or the authentication spell is defined by the user.

Example 4 may include the wand of example 3 and/or any other one or more examples disclosed herein, wherein to define the authentication spell, the user is to perform the one or more gestures during a registration period, wherein the registration period is to be initiated during a setup of the wand, and during the setup, the spell module is to generate the authentication spell sequence based on one or more gestures performed during the registration period, store the authentication spell sequence in association with a defined authentication spell output, and provide the authentication spell sequence and the defined authentication spell output to the computing device or the accounting server, wherein the defined authentication spell output is a desired spell output defined by the user during the registration period and to be used as the authentication spell output.

Example 5 may include the wand of example 4 and/or any other one or more examples disclosed herein, wherein the registration period is to begin upon reception of a setup-start indicator and terminate upon reception of a setup-termination indicator, wherein the setup-termination indicator is to indicate one of a timer associated with the registration period has expired, a predetermined counter value of a counter associated with the registration period has been reached, or a predetermined gesture for termination of the registration period has been performed.

Example 6 may include the wand of example 5 and/or any other one or more examples disclosed herein, wherein the spell module is to receive the setup-termination indicator via the wand communications module, and in response to reception of the termination indicator, the spell module is to generate the authentication spell sequence, wherein the setup-termination indicator is to be received from the computing device or the accounting server, or the setup-start indicator is to be received from the device interface module in response to performance of one or more predefined gestures.

Example 7 may include the wand of example 3 and/or any other one or more examples disclosed herein, wherein, when the authentication spell is assigned to the user, the computing device or a second device communicatively coupled with the wand is to display media content during a registration period, wherein the media content is to indicate one or more gestures to be performed to obtain the authentication spell output, wherein the registration period is to be initiated during a setup of the wand, and during the setup, the spell module is to generate the authentication spell sequence based on the indicated one or more gestures performed by the user during the registration period, store the authentication spell sequence in association with a defined authentication spell output, and provide the authentication spell sequence to the computing device or an accounting server to be stored in association with the authentication spell output.

Example 8 may include the wand of any of examples 1 or 2 and/or any other one or more examples disclosed herein, wherein reception of the authentication spell output or the inactivation spell output is based on a comparison of the spell sequence with a defined spell sequence for each of the plurality of spells, a determination of a degree of similarity between the spell sequence and the defined spell sequence of each of the plurality of spells, wherein the degree of similarity indicates a number and order of operations of the spell sequence that matches a number and order of operations of the defined spell sequence, and a selection of the spell wherein the spell has a greatest degree of similarity among the plurality of spells.

Example 9 may include the wand of any of examples 1 or 2 and/or any other one or more examples disclosed herein, wherein the receipt of the authentication spell output or the inactivation spell output is based on a determination of a wand position relative to one or more auxiliary devices and an auxiliary device identifier, wherein and the auxiliary device identifier is to be obtained from a signal broadcast by the auxiliary device, and wherein the signal broadcast by the auxiliary device is to be received directly by the wand communication module by way of a scan of a region surrounding the wand for the signal or the signal broadcast by the auxiliary device is to be received by the wand communication module via the computing device wherein the computing device is to perform a scan of a region surrounding the wand for the signal.

Example 10 may include the wand of any of examples 1 or 2 and/or any other one or more examples disclosed herein, wherein the receipt of the authentication spell output or the inactivation spell output is based on a determination of a wand position relative to another wand and receipt of a spell indicator, wherein the spell indicator is to be obtained from a first signal broadcast by the other wand or a second signal broadcast by another computing device communicatively coupled with the other wand, and wherein the first signal or the second signal is to be received directly by the wand communication module by way of a scan of a region surrounding the wand for the first signal and the second signal, or the first signal or the second signal is to be received by the wand communication module via the computing device wherein the computing device is to perform a scan of a region surrounding the wand for the first signal and the second signal.

Example 11 may include the wand of example 10 and/or any other one or more examples disclosed herein, wherein the spell indicator is to indicate another spell sequence wherein the other spell sequence is to indicate one or more gestures performed by another user of the other wand, and reception of the authentication spell output is based on a determination of a degree of similarity between the spell sequence and the other spell sequence.

Example 12 may include the wand of any of examples 1 or 2 and/or any other one or more examples disclosed herein, wherein the one or more sensors include an accelerometer, a geomagnetic sensor, a gyroscope, a microphone, and a biometric sensor, and wherein the one or more gestures include at least one of a voice input to the microphone or a biotic input to the biometric sensor such that the spell sequence is unique to the user and one or more other gestures performed by another user using the wand are unique to the other user.

Example 13 may include the wand of example 12, and/or any other one or more examples disclosed herein wherein the one or more gestures include a bodily movement and the accelerometer, the geomagnetic sensor, and the gyroscope are to generate the sensor data based on a performance of the bodily movement by the user, and generate different sensor data based on a performance of the bodily movement by another user.

Example 14 may include at least one computer readable medium, including instructions to cause, a computing device, in response to execution of the instructions by the computing device, to obtain a spell sequence indicative of one or more gestures wherein the one or more gestures are movements performed using a wand by the user; authenticate an identity of the user including, determining, by the computing device, whether the spell sequence matches an authentication spell sequence; when the spell sequence corresponds with the authentication spell sequence, provide an authentication spell output, wherein the authentication spell output indicates, by activating one or more first devices of the wand or activating one or more second devices communicatively coupled with the wand, that the user is authorized to use the wand; and when the spell sequence does not correspond with the authentication spell sequence, provide an inactivation spell output, wherein the inactivation spell output indicates, by activating the one or more first devices of the wand or activating the one or more second devices communicatively coupled with the wand, that the user is not authorized to use the wand. The at least one computer-readable medium may be a non-transitory computer-readable medium.

Example 15 may include the at least one computer-readable medium of example 14 and/or any other one or more examples disclosed herein, wherein the authentication spell is assigned to the user via an accounting server or the authentication spell is defined by the user.

Example 16 may include the at least one computer-readable medium of example 15 and/or any other one or more examples disclosed herein, wherein to define the authentication spell, the user is to perform the one or more gestures during a registration period, wherein the registration period is to be initiated during a setup of the wand, and the instructions cause the computing device to obtain a defined authentication spell output and the authentication spell sequence, wherein the authentication spell sequence is based on one or more gestures performed during the registration period, and the defined authentication spell output is a desired spell output defined by the user during the registration period to be used as the authentication spell output; and provide the authentication spell sequence and the defined authentication spell output to the accounting server.

Example 17 may include the at least one computer-readable medium of example 16 and/or any other one or more examples disclosed herein, wherein the instructions cause the computing device to provide a setup-start indicator to the wand, wherein the registration period is to begin upon reception of the setup-start indicator; and provide a setup-termination indicator to the wand, wherein the registration period is to terminate upon reception of the setup-termination indicator, wherein the setup-termination indicator is to indicate one of a timer associated with the registration period has expired, a predetermined counter value of a counter associated with the registration period has been reached, or a predetermined gesture for termination of the registration period has been performed.

Example 18 may include the at least one computer-readable medium of example 17 and/or any other one or more examples disclosed herein, wherein the instructions cause the computing device to before the setup-start indicator is to be provided to the wand, receive the setup-start indicator from the accounting server, or generating the setup-start indicator in response to receiving an input indicating to start the registration period; and before the setup-termination indicator is to be provided to the wand, receive the setup-termination indicator from the accounting server, or generating the setup-start indicator in response to receiving an input indicating to end the registration period.

Example 19 may include the at least one computer-readable medium of example 15 and/or any other one or more examples disclosed herein, wherein, when the authentication spell is assigned to the user, the instructions cause the computing device to display media content during a registration period, wherein the media content is to indicate one or more gestures to be performed to obtain the authentication spell output, wherein the registration period is to be initiated during a setup of the wand, and during the setup; receive the authentication spell sequence, wherein the authentication spell sequence indicates that the user performed the one or more gestures for obtaining the authentication spell output; and provide the authentication spell output in response to receiving the authentication spell sequence.

Example 20 may include the at least one computer-readable medium of example 14 and/or any other one or more examples disclosed herein, wherein to determine whether the spell sequence matches the authentication spell sequence the instructions cause the computing device to compare the obtained spell sequence with a defined spell sequence for each of a plurality of spells; determine a degree of similarity between the spell sequence and the defined spell sequence of each of the plurality of spells, wherein the degree of similarity indicates a number and order of operations of the spell sequence that matches a number and order of operations of the defined spell sequence, and select a spell having a greatest degree of similarity among the plurality of spells.

Example 21 may include the at least one computer-readable medium of example 14 and/or any other one or more examples disclosed herein, wherein to authenticate the identity of the user the instructions cause the computing device to determine a wand position relative to one or more auxiliary devices; obtain an auxiliary device identifier by extracting the auxiliary device identifier from one or more data packets of a signal broadcast by the auxiliary device; and determine whether the auxiliary device identifier indicates to authorize the user to use the wand.

Example 22 may include the at least one computer-readable medium of example 14 and/or any other one or more examples disclosed herein, wherein to authenticate the identity of the user the instructions cause the computing device to determine a wand position relative to another wand; obtain a spell indicator from a first signal broadcast by the other wand or a second signal broadcast by another computing device communicatively coupled with the other wand, wherein the spell indicator indicates another spell sequence wherein the other spell sequence indicates one or more gestures performed by another user of the other wand; determine a degree of similarity between the spell sequence and the other spell sequence; and provide the authentication spell output when the degree of similarity between the spell sequence and the other spell sequence is above a predefined threshold.

Example 23 may include the at least one computer-readable medium of example 14 and/or any other one or more examples disclosed herein, wherein the one or more gestures include at least one of a voice input of from a microphone or a biotic input from a biometric sensor such that the spell sequence is unique to the user and one or more other gestures performed by another user using the wand are unique to the other user, and the one or more gestures include a bodily movement such that the spell sequence based on a performance of the bodily movement by the user is different than another spell sequence base on a same performance of the bodily movement by another user.

Example 24 may include the at least one computer-readable medium of example 14 and/or any other one or more examples disclosed herein, wherein the computing device is a different device than the wand and is communicatively coupled with the wand, or the computing device resides in the wand.

Example 25 may include a computer-implemented method for authenticating that a user is authorized to use a wand, the method comprising obtaining, by a computing device, a spell sequence indicative of one or more gestures wherein the one or more gestures are movements performed using a wand by the user; authenticating an identity of the user including, determining, by the computing device, whether the spell sequence matches an authentication spell sequence; when the spell sequence corresponds with the authentication spell sequence, providing, by the computing device, an authentication spell output, wherein the authentication spell output indicates, by activating one or more first devices of the wand or activating one or more second devices communicatively coupled with the wand, that the user is authorized to use the wand; and when the spell sequence does not correspond with the authentication spell sequence, providing, by the computing device, an inactivation spell output, wherein the inactivation spell output indicates, by activating the one or more first devices of the wand or activating the one or more second devices communicatively coupled with the wand, that the user is not authorized to use the wand.

Example 26 may include the method of example 25 and/or any other one or more examples disclosed herein, wherein the authentication spell is assigned to the user via an accounting server or the authentication spell is defined by the user.

Example 27 may include the method of example 26 and/or any other one or more examples disclosed herein, wherein to define the authentication spell, the user is to perform the one or more gestures during a registration period, wherein the registration period is to be initiated during a setup of the wand, and the method further comprises obtaining, by the computing device, a defined authentication spell output and the authentication spell sequence, wherein the authentication spell sequence is based on one or more gestures performed during the registration period, and the defined authentication spell output is a desired spell output defined by the user during the registration period to be used as the authentication spell output; and providing, by the computing device, the authentication spell sequence and the defined authentication spell output to the accounting server.

Example 28 may include the method of example 27 and/or any other one or more examples disclosed herein, further comprising providing, by the computing device, a setup-start indicator to the wand, wherein the registration period is to begin upon reception of the setup-start indicator; and providing, by the computing device, a setup-termination indicator to the wand, wherein the registration period is to terminate upon reception of the setup-termination indicator, wherein the setup-termination indicator is to indicate one of a timer associated with the registration period has expired, a predetermined counter value of a counter associated with the registration period has been reached, or a predetermined gesture for termination of the registration period has been performed.

Example 29 may include the method of example 28 and/or any other one or more examples disclosed herein, further comprising, before providing the setup-start indicator to the wand, receiving, by the computing device, the setup-start indicator from the accounting server, or generating the setup-start indicator in response to receiving an input indicating to start the registration period; and before providing the setup-termination indicator to the wand, receiving, by the computing device, the setup-termination indicator from the accounting server, or generating the setup-start indicator in response to receiving an input indicating to end the registration period.

Example 30 may include the method of example 26 and/or any other one or more examples disclosed herein, wherein, when the authentication spell is assigned to the user, the method further comprises displaying, by the computing device, media content during a registration period, wherein the media content is to indicate one or more gestures to be performed to obtain the authentication spell output, wherein the registration period is to be initiated during a setup of the wand, and during the setup; receiving, by the computing device, the authentication spell sequence, wherein the authentication spell sequence indicates that the user performed the one or more gestures for obtaining the authentication spell output; and providing, by the computing device, the authentication spell output in response to receiving the authentication spell sequence.

Example 31 may include the method of example 25 and/or any other one or more examples disclosed herein, wherein determining whether the spell sequence matches the authentication spell sequence comprises comparing of the obtained spell sequence with a defined spell sequence for each of a plurality of spells; determining a degree of similarity between the spell sequence and the defined spell sequence of each of the plurality of spells, wherein the degree of similarity indicates a number and order of operations of the spell sequence that matches a number and order of operations of the defined spell sequence, and selecting a spell having a greatest degree of similarity among the plurality of spells.

Example 32 may include the method of example 25 and/or any other one or more examples disclosed herein, wherein authenticating the identity of the user further comprises determining a wand position relative to one or more auxiliary devices; obtaining an auxiliary device identifier by extracting the auxiliary device identifier from one or more data packets of a signal broadcast by the auxiliary device; and determining whether the auxiliary device identifier indicates to authorize the user to use the wand.

Example 33 may include the method of example 25 and/or any other one or more examples disclosed herein, wherein authenticating the identity of the user further comprises determining a wand position relative to another wand; obtaining a spell indicator from a first signal broadcast by the other wand or a second signal broadcast by another computing device communicatively coupled with the other wand, wherein the spell indicator indicates another spell sequence wherein the other spell sequence indicates one or more gestures performed by another user of the other wand; determining a degree of similarity between the spell sequence and the other spell sequence; and providing the authentication spell output when the degree of similarity between the spell sequence and the other spell sequence is above a predefined threshold.

Example 34 may include the method of example 25 and/or any other one or more examples disclosed herein, wherein the one or more gestures include at least one of a voice input of from a microphone or a biotic input from a biometric sensor such that the spell sequence is unique to the user and one or more other gestures performed by another user using the wand are unique to the other user, and the one or more gestures include a bodily movement such that the spell sequence based on a performance of the bodily movement by the user is different than another spell sequence base on a same performance of the bodily movement by another user.

Example 35 may include the method of example 25 and/or any other one or more examples disclosed herein, wherein the computing device is a different device than the wand and communicatively coupled with the wand, or the computing device resides in the wand.

Example 36 may include at least one computer-readable medium including instructions to cause a computing device, in response to execution of the instructions by the computing device, to perform the method of examples 25-35 and/or any other one or more examples disclosed herein. The at least one computer-readable medium may be a non-transitory computer readable medium.

Example 37 may include a wand comprising one or more sensors, communicatively coupled with at least one processor, to detect one or more gestures wherein the one or more gestures are movements performed using the wand by a user of the wand, and generate sensor data representative of the one or more gestures; a device interface module to operate on the at least one processor to obtain, from the one or more sensors, the generated sensor data representative of the one or more gestures; a spell module to operate on the at least one processor to receive, from the device interface module, the obtained sensor data representative of the one or more gestures, and convert the obtained sensor data representative of the one or more gestures into a spell sequence, wherein the spell module includes a spell determination module to determine a spell from a plurality of spells based on the spell sequence wherein each of the plurality of spells is associated with a defined spell sequence, determine a spell output associated with the determined spell, and provide the spell output by way of at least one of a first instruction to the device interface module to activate one or more first devices and a second instruction to a wand communication module to activate one or more second devices; and the wand communication module, communicatively coupled with the at least one processor, to receive, from the spell determination module, one of an authentication spell output when the spell sequence corresponds with an authentication spell sequence or an inactivation spell output when the spell sequence does not correspond with the authentication spell sequence, and provide the authentication spell output or the inactivation spell output to the one or more second devices.

Example 38 may include the wand of example 37 and/or any other one or more examples disclosed herein, wherein when the spell sequence matches the authentication spell sequence, the spell module is to transmit an authentication first instruction to the device interface module to activate one or more first devices according to the authentication spell output; and when the spell sequence does not match the authentication spell sequence, the spell module is to transmit an inactivation first instruction to the device interface module to activate the one or more first devices according to the inactivation spell output.

Example 39 may include the wand of any of examples 37 or 38 and/or any other one or more examples disclosed herein, wherein the authentication spell is assigned to the user via an accounting server or the authentication spell is defined by the user.

Example 40 may include the wand of example 39 and/or any other one or more examples disclosed herein, wherein to define the authentication spell, the user is to perform the one or more gestures during a registration period, wherein the registration period is to be initiated during a setup of the wand, and during the setup, the spell module is to generate the authentication spell sequence based on one or more gestures performed during the registration period, store the authentication spell sequence in association with a defined authentication spell output, and provide the authentication spell sequence and the defined authentication spell output to a computing device or the accounting server, wherein the defined authentication spell output is a desired spell output defined by the user during the registration period and to be used as the authentication spell output.

Example 41 may include the wand of example 40 and/or any other one or more examples disclosed herein, wherein the registration period is to begin upon reception of a setup-start indicator and terminate upon reception of a setup-termination indicator, wherein the setup-termination indicator is to indicate one of a timer associated with the registration period has expired, a predetermined counter value of a counter associated with the registration period has been reached, or a predetermined gesture for termination of the registration period has been performed.

Example 42 may include the wand of example 41 and/or any other one or more examples disclosed herein, wherein the spell module is to receive the setup-termination indicator via the wand communications module, and in response to reception of the termination indicator, the spell module is to generate the authentication spell sequence, wherein the setup-termination indicator is to be received from the computing device or the accounting server, or the setup-start indicator is to be received from the device interface module in response to performance of one or more predefined gestures.

Example 43 may include the wand of example 39 and/or any other one or more examples disclosed herein, wherein, when the authentication spell is assigned to the user, the computing device or a second device communicatively coupled with the wand is to display media content during a registration period, wherein the media content is to indicate one or more gestures to be performed to obtain the authentication spell output, wherein the registration period is to be initiated during a setup of the wand, and during the setup, the spell module is to generate the authentication spell sequence based on the indicated one or more gestures performed by the user during the registration period, store the authentication spell sequence in association with a defined authentication spell output, and provide the authentication spell sequence to the computing device or an accounting server to be stored in association with the authentication spell output.

Example 44 may include the wand of any of examples 37 or 38 and/or any other one or more examples disclosed herein, wherein the spell determination module is to provide the authentication spell output or the inactivation spell output based on a comparison of the spell sequence with a defined spell sequence for each of the plurality of spells, a determination of a degree of similarity between the spell sequence and the defined spell sequence of each of the plurality of spells, wherein the degree of similarity indicates a number and order of operations of the spell sequence that matches a number and order of operations of the defined spell sequence, and a selection of the spell wherein the spell has a greatest degree of similarity among the plurality of spells.

Example 45 may include the wand of any of examples 37 or 38 and/or any other one or more examples disclosed herein, wherein the spell determination module is to provide the authentication spell output or the inactivation spell output based on a determination of a wand position relative to one or more auxiliary devices and an auxiliary device identifier, wherein and the auxiliary device identifier is to be obtained from a signal broadcast by the auxiliary device, and wherein the signal broadcast by the auxiliary device is to be received directly by the wand communication module by way of a scan of a region surrounding the wand for the signal or the signal broadcast by the auxiliary device is to be received by the wand communication module via a computing device wherein the computing device is to perform a scan of a region surrounding the wand for the signal.

Example 46 may include the wand of any of examples 37 or 38 and/or any other one or more examples disclosed herein, wherein the receipt of the authentication spell output or the inactivation spell output is based on a determination of a wand position relative to another wand and receipt of a spell indicator, wherein the spell indicator is to be obtained from a first signal broadcast by the other wand or a second signal broadcast by another computing device communicatively coupled with the other wand, and wherein the first signal or the second signal is to be received directly by the wand communication module by way of a scan of a region surrounding the wand for the first signal and the second signal, or the first signal or the second signal is to be received by the wand communication module via a computing device communicatively coupled with the wand wherein the computing device is to perform a scan of a region surrounding the wand for the first signal and the second signal.

Example 47 may include the wand of example 46 and/or any other one or more examples disclosed herein, wherein the spell indicator is to indicate another spell sequence wherein the other spell sequence is to indicate one or more gestures performed by another user of the other wand, and reception of the authentication spell output is based on a determination of a degree of similarity between the spell sequence and the other spell sequence.

Example 48 may include the wand of any of examples 37 or 38 and/or any other one or more examples disclosed herein, wherein the one or more sensors include an accelerometer, a geomagnetic sensor, a gyroscope, a microphone, and a biometric sensor, and wherein the one or more gestures include at least one of a voice input to the microphone or a biotic input to the biometric sensor such that the spell sequence is unique to the user and one or more other gestures performed by another user using the wand are unique to the other user.

Example 49 may include the wand of example 48 and/or any other one or more examples disclosed herein, wherein the one or more gestures include a bodily movement and the accelerometer, the geomagnetic sensor, and the gyroscope are to generate the sensor data based on a performance of the bodily movement by the user, and generate different sensor data based on a performance of the bodily movement by another user.

Example 50 may include a system comprising an accounting server; a wand comprising one or more sensors, communicatively coupled with at least one processor, to detect one or more gestures wherein the one or more gestures are movements performed using the wand by a user of the wand, and generate sensor data representative of the one or more gestures; a device interface module to operate on the at least one processor to obtain, from the one or more sensors, the generated sensor data representative of the one or more gestures; a spell module to operate on the at least one processor to receive, from the device interface module, the obtained sensor data representative of the one or more gestures, and convert the obtained sensor data representative of the one or more gestures into a spell sequence; and a wand communication module, communicatively coupled with the at least one processor, to transmit the spell sequence to a computing device, and receive, from the computing device, one of an authentication spell output when the spell sequence corresponds with an authentication spell sequence or an inactivation spell output when the spell sequence does not correspond with the authentication spell sequence; and the computing device comprising a spell determination module to operate on at least one processor of the computing device to determine a spell from a plurality of spells based on the spell sequence wherein each of the plurality of spells is associated with a defined spell sequence, determine a spell output associated with the determined spell, and provide the spell output by way of a second instruction for activation of one or more second devices; and a network interface to receive, from the wand, the spell sequence, and provide, to the wand or the one or more second devices, the determined spell output, wherein when the determined spell corresponds to an authentication spell, the determined spell output is the authentication spell output, and when the determined spell corresponds to an inactivation spell, the determined spell output is the inactivation spell output.

Example 51 may include the system of example 50 and/or any other one or more examples disclosed herein, wherein when the spell sequence matches the authentication spell sequence, the spell module is to transmit an authentication first instruction to the device interface module to activate one or more first devices of the wand according to the authentication spell output; and when the spell sequence does not match the authentication spell sequence, the spell module is to transmit an inactivation first instruction to the device interface module to activate the one or more first devices according to the inactivation spell output.

Example 52 may include the system of any of examples 50 or 51 and/or any other one or more examples disclosed herein, wherein the authentication spell is assigned to the user via an accounting server or the authentication spell is defined by the user.

Example 53 may include the system of example 52 and/or any other one or more examples disclosed herein, wherein to define the authentication spell, the user is to perform the one or more gestures during a registration period, wherein the registration period is to be initiated during a setup of the wand, and during the setup, the spell module is to generate the authentication spell sequence based on one or more gestures performed during the registration period, store the authentication spell sequence in association with a defined authentication spell output, and provide the authentication spell sequence and the defined authentication spell output to the computing device or the accounting server, wherein the defined authentication spell output is a desired spell output defined by the user during the registration period and to be used as the authentication spell output.

Example 54 may include the system of example 53 and/or any other one or more examples disclosed herein, wherein the registration period is to begin upon reception of a setup-start indicator and terminate upon reception of a setup-termination indicator, wherein the setup-termination indicator is to indicate one of a timer associated with the registration period has expired, a predetermined counter value of a counter associated with the registration period has been reached, or a predetermined gesture for termination of the registration period has been performed.

Example 55 may include the system of example 54 and/or any other one or more examples disclosed herein, wherein the spell module is to receive the setup-termination indicator via the wand communications module, and in response to reception of the termination indicator, the spell module is to generate the authentication spell sequence, wherein the setup-termination indicator is to be received from the computing device or the accounting server, or the setup-start indicator is to be received from the device interface module in response to performance of one or more predefined gestures.

Example 56 may include the system of example 52 and/or any other one or more examples disclosed herein, wherein, when the authentication spell is assigned to the user, the computing device or a second device communicatively coupled with the wand is to display media content during a registration period, wherein the media content is to indicate one or more gestures to be performed to obtain the authentication spell output, wherein the registration period is to be initiated during a setup of the wand, and during the setup, the spell module is to generate the authentication spell sequence based on the indicated one or more gestures performed by the user during the registration period, store the authentication spell sequence in association with a defined authentication spell output, and provide the authentication spell sequence to the computing device or an accounting server to be stored in association with the authentication spell output.

Example 57 may include the system of any of examples 50 or 51 and/or any other one or more examples disclosed herein, wherein reception of the authentication spell output or the inactivation spell output is based on a comparison of the spell sequence with a defined spell sequence for each of the plurality of spells, a determination of a degree of similarity between the spell sequence and the defined spell sequence of each of the plurality of spells, wherein the degree of similarity indicates a number and order of operations of the spell sequence that matches a number and order of operations of the defined spell sequence, and a selection of the spell wherein the spell has a greatest degree of similarity among the plurality of spells.

Example 58 may include the system of any of examples 50 or 51 and/or any other one or more examples disclosed herein, wherein the receipt of the authentication spell output or the inactivation spell output is based on a determination of a wand position relative to one or more auxiliary devices and an auxiliary device identifier, wherein and the auxiliary device identifier is to be obtained from a signal broadcast by the auxiliary device, and wherein the signal broadcast by the auxiliary device is to be received directly by the wand communication module by way of a scan of a region surrounding the wand for the signal or the signal broadcast by the auxiliary device is to be received by the wand communication module via the computing device wherein the computing device is to perform a scan of a region surrounding the wand for the signal.

Example 59 may include the system of any of examples 50 or 51 and/or any other one or more examples disclosed herein, wherein the receipt of the authentication spell output or the inactivation spell output is based on a determination of a wand position relative to another wand and receipt of a spell indicator, wherein the spell indicator is to be obtained from a first signal broadcast by the other wand or a second signal broadcast by another computing device communicatively coupled with the other wand, and wherein the first signal or the second signal is to be received directly by the wand communication module by way of a scan of a region surrounding the wand for the first signal and the second signal, or the first signal or the second signal is to be received by the wand communication module via the computing device wherein the computing device is to perform a scan of a region surrounding the wand for the first signal and the second signal.

Example 60 may include the system of example 59 and/or any other one or more examples disclosed herein, wherein the spell indicator is to indicate another spell sequence wherein the other spell sequence is to indicate one or more gestures performed by another user of the other wand, and reception of the authentication spell output is based on a determination of a degree of similarity between the spell sequence and the other spell sequence.

Example 61 may include the system of any of examples 50 or 51 and/or any other one or more examples disclosed herein, wherein the one or more sensors include an accelerometer, a geomagnetic sensor, a gyroscope, a microphone, and a biometric sensor, and wherein the one or more gestures include at least one of a voice input to the microphone or a biotic input to the biometric sensor such that the spell sequence is unique to the user and one or more other gestures performed by another user using the wand are unique to the other user.

Example 62 may include the system of example 61 and/or any other one or more examples disclosed herein, wherein the one or more gestures include a bodily movement and the accelerometer, the geomagnetic sensor, and the gyroscope are to generate the sensor data based on a performance of the bodily movement by the user, and generate different sensor data based on a performance of the bodily movement by another user.

Example 63 may include a wand comprising: sensing means for detecting one or more gestures wherein the one or more gestures are movements performed using the wand by a user of the wand, and generating sensor data representative of the one or more gestures; device interface means for obtaining, from the one or more sensors, the generated sensor data representative of the one or more gestures; spell means for receiving, from the device interface means, the obtained sensor data representative of the one or more gestures, and converting the obtained sensor data representative of the one or more gestures into a spell sequence; and wand communication means for transmitting the spell sequence to a computing device, and receiving, from the computing device, one of an authentication spell output when the spell sequence corresponds with an authentication spell sequence or an inactivation spell output when the spell sequence does not correspond with the authentication spell sequence.

Example 64 may include the wand of example 63 and/or any other one or more examples disclosed herein, wherein when the spell sequence matches the authentication spell sequence, the spell means is for transmitting an authentication first instruction to the device interface means to activate one or more first devices according to the authentication spell output; and when the spell sequence does not match the authentication spell sequence, the spell means is for transmitting an inactivation first instruction to the device interface means to activate the one or more first devices according to the inactivation spell output.

Example 65 may include the wand of any of examples 63 or 64 and/or any other one or more examples disclosed herein, wherein the authentication spell is assigned to the user via an accounting server or the authentication spell is defined by the user.

Example 66 may include the of example 65 and/or any other one or more examples disclosed herein, wherein to define the authentication spell, the user is to perform the one or more gestures during a registration period, wherein the registration period is to be initiated during a setup of the wand, and during the setup, the spell means is for generating the authentication spell sequence based on one or more gestures performed during the registration period, storing the authentication spell sequence in association with a defined authentication spell output, and providing the authentication spell sequence and the defined authentication spell output to the computing device or the accounting server, wherein the defined authentication spell output is a desired spell output defined by the user during the registration period and to be used as the authentication spell output.

Example 67 may include the of example 66 and/or any other one or more examples disclosed herein, wherein the registration period is to begin upon reception of a setup-start indicator and terminate upon reception of a setup-termination indicator, wherein the setup-termination indicator is to indicate one of a timer associated with the registration period has expired, a predetermined counter value of a counter associated with the registration period has been reached, or a predetermined gesture for termination of the registration period has been performed.

Example 68 may include the wand of example 67 and/or any other one or more examples disclosed herein, wherein the spell means is for receiving the setup-termination indicator via the wand communications means, and in response to reception of the termination indicator, the spell means is for generating the authentication spell sequence, wherein the setup-termination indicator is to be received from the computing device or the accounting server, or the setup-start indicator is to be received from the device interface means in response to performance of one or more predefined gestures.

Example 69 may include the wand of example 65 and/or any other one or more examples disclosed herein, wherein, when the authentication spell is assigned to the user, the computing device or a second device communicatively coupled with the wand is to display media content during a registration period, wherein the media content is to indicate one or more gestures to be performed to obtain the authentication spell output, wherein the registration period is to be initiated during a setup of the wand, and during the setup, the spell means is for generating the authentication spell sequence based on the indicated one or more gestures performed by the user during the registration period, store the authentication spell sequence in association with a defined authentication spell output, and provide the authentication spell sequence to the computing device or an accounting server to be stored in association with the authentication spell output.

Example 70 may include the wand of any of examples 63 or 64 and/or any other one or more examples disclosed herein, wherein reception of the authentication spell output or the inactivation spell output is based on a comparison of the spell sequence with a defined spell sequence for each of the plurality of spells, a determination of a degree of similarity between the spell sequence and the defined spell sequence of each of the plurality of spells, wherein the degree of similarity indicates a number and order of operations of the spell sequence that matches a number and order of operations of the defined spell sequence, and a selection of the spell wherein the spell has a greatest degree of similarity among the plurality of spells.

Example 71 may include the wand of any of examples 63 or 64 and/or any other one or more examples disclosed herein, wherein the receipt of the authentication spell output or the inactivation spell output is based on a determination of a wand position relative to one or more auxiliary devices and an auxiliary device identifier, wherein and the auxiliary device identifier is to be obtained from a signal broadcast by the auxiliary device, and wherein the signal broadcast by the auxiliary device is to be received directly by the wand communication means by way of a scan of a region surrounding the wand for the signal or the signal broadcast by the auxiliary device is to be received by the wand communication means via the computing device wherein the computing device is to perform a scan of a region surrounding the wand for the signal.

Example 72 may include the wand of any of examples 63 or 64 and/or any other one or more examples disclosed herein, wherein the receipt of the authentication spell output or the inactivation spell output is based on a determination of a wand position relative to another wand and receipt of a spell indicator, wherein the spell indicator is to be obtained from a first signal broadcast by the other wand or a second signal broadcast by another computing device communicatively coupled with the other wand, and wherein the first signal or the second signal is to be received directly by the wand communication means by way of a scan of a region surrounding the wand for the first signal and the second signal, or the first signal or the second signal is to be received by the wand communication means via the computing device wherein the computing device is to perform a scan of a region surrounding the wand for the first signal and the second signal.

Example 73 may include the wand of example 72 and/or any other one or more examples disclosed herein, wherein the spell indicator is to indicate another spell sequence wherein the other spell sequence is to indicate one or more gestures performed by another user of the other wand, and reception of the authentication spell output is based on a determination of a degree of similarity between the spell sequence and the other spell sequence.

Example 74 may include the wand of any of examples 63 or 64 and/or any other one or more examples disclosed herein, wherein the one or more sensors include an accelerometer, a geomagnetic sensor, a gyroscope, a microphone, and a biometric sensor, and wherein the one or more gestures include at least one of a voice input to the microphone or a biotic input to the biometric sensor such that the spell sequence is unique to the user and one or more other gestures performed by another user using the wand are unique to the other user.

Example 75 may include the wand of example 74 and/or any other one or more examples disclosed herein, wherein the one or more gestures include a bodily movement and the accelerometer, the geomagnetic sensor, and the gyroscope are to generate the sensor data based on a performance of the bodily movement by the user, and generate different sensor data based on a performance of the bodily movement by another user.

Example 76 may include the wand of any of examples 63 or 64 and/or any other one or more examples disclosed herein, wherein the spell means comprises a spell determination means for determining a spell from a plurality of spells based on the spell sequence wherein each of the plurality of spells is associated with a defined spell sequence, determining a spell output associated with the determined spell, and providing the spell output by way of at least one of a first instruction to the device interface means to activate one or more first devices and a second instruction to a wand communication means to activate one or more second devices, and wherein the wand communication means is for receiving, from the spell determination means, one of an authentication spell output when the spell sequence corresponds with an authentication spell sequence or an inactivation spell output when the spell sequence does not correspond with the authentication spell sequence, and providing the authentication spell output or the inactivation spell output to the one or more second devices.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein, limited only by the claims.

We claim:

1. A wand comprising:
one or more sensors, communicatively coupled with at least one hardware processor, to detect one or more gestures wherein the one or more gestures are movements performed using the wand by a user of the wand, and generate sensor data representative of the one or more gestures;
a device interface module to operate on the at least one hardware processor to obtain, from the one or more sensors, the generated sensor data representative of the one or more gestures;
a spell module to operate on the at least one hardware processor to receive, from the device interface module, the obtained sensor data representative of the one or more gestures, and convert the obtained sensor data representative of the one or more gestures into a spell sequence to authenticate the user based on the sensor data from the one or more sensors; and
a wand communication module, communicatively coupled with the at least one hardware processor, to transmit the spell sequence to a computing device, and receive, from the computing device, one of an authentication spell output when the spell sequence matches an authentication spell sequence or an inactivation spell output when the spell sequence does not match the authentication spell sequence.

2. The wand of claim 1, wherein
when the spell sequence matches the authentication spell sequence, the spell module is to transmit an authentication first instruction to the device interface module to activate one or more first devices according to the authentication spell output; and
when the spell sequence does not match the authentication spell sequence, the spell module is to transmit an inactivation first instruction to the device interface module to activate the one or more first devices according to the inactivation spell output.

3. The wand of claim 1, wherein the authentication spell sequence is assigned to the user via an accounting server or the authentication spell sequence is defined by the user.

4. The wand of claim 3, wherein to define the authentication spell sequence, the user is to perform the one or more gestures during a registration period, wherein the registration period is to be initiated during a setup of the wand, and during the setup, the spell module is to generate the authentication spell sequence based on one or more gestures performed during the registration period, store the authentication spell sequence in association with a defined authentication spell output, and provide the authentication spell sequence and the defined authentication spell output to the computing device or the accounting server, wherein the defined authentication spell output is a desired spell output defined by the user during the registration period and to be used as the authentication spell output.

5. The wand of claim 4, wherein the registration period is to begin upon reception of a setup-start indicator and terminate upon reception of a setup-termination indicator, wherein the setup-termination indicator is to indicate one of a timer associated with the registration period has expired, a predetermined counter value of a counter associated with the registration period has been reached, or a predetermined gesture for termination of the registration period has been performed.

6. The wand of claim 5, wherein the spell module is to receive the setup-termination indicator via the wand communications module, and in response to reception of the termination indicator, the spell module is to generate the authentication spell sequence, wherein the setup-termination indicator is to be received from the computing device or the accounting server, or the setup-start indicator is to be received from the device interface module in response to performance of one or more predefined gestures.

7. The wand of claim 3, wherein, when the authentication spell sequence is assigned to the user, the computing device or a second device communicatively coupled with the wand is to display media content during a registration period, wherein the media content is to indicate one or more gestures to be performed to obtain the authentication spell output, wherein the registration period is to be initiated during a setup of the wand, and during the setup, the spell module is to generate the authentication spell sequence based on the indicated one or more gestures performed by the user during the registration period, store the authentication spell sequence in association with a defined authentication spell output, and provide the authentication spell sequence to the computing device or an accounting server to be stored in association with the authentication spell output.

8. The wand of claim 1, wherein reception of the authentication spell output or the inactivation spell output is based on a comparison of the spell sequence with a defined spell sequence for each of the plurality of spells, a determination of a degree of similarity between the spell sequence and the defined spell sequence of each of a plurality of spells, wherein the degree of similarity indicates a number and order of operations of the spell sequence that matches a number and order of operations of the defined spell sequence, and a selection of the spell wherein the spell has a greatest degree of similarity among the plurality of spells.

9. The wand of claim 1, wherein the receipt of the authentication spell output or the inactivation spell output is based on a determination of a wand position relative to one or more auxiliary devices and an auxiliary device identifier, wherein the auxiliary device identifier is to be obtained from a signal broadcast by the auxiliary device, and
wherein the signal broadcast by the auxiliary device is to be received directly by the wand communication module by way of a scan of a region surrounding the wand for the signal or the signal broadcast by the auxiliary device is to be received by the wand communication module via the computing device wherein the computing device is to perform a scan of a region surrounding the wand for the signal.

10. The wand of claim 1, wherein the receipt of the authentication spell output or the inactivation spell output is based on a determination of a wand position relative to another wand and receipt of a spell indicator, wherein the spell indicator is to be obtained from a first signal broadcast by the other wand or a second signal broadcast by another computing device communicatively coupled with the other wand, and
wherein the first signal or the second signal is to be received directly by the wand communication module by way of a scan of a region surrounding the wand for the first signal and the second signal, or the first signal or the second signal is to be received by the wand communication module via the computing device wherein the computing device is to perform a scan of a region surrounding the wand for the first signal and the second signal.

11. The wand of claim 10, wherein the spell indicator is to indicate another spell sequence wherein the other spell sequence is to indicate one or more gestures performed by another user of the other wand, and reception of the authentication spell output is based on a determination of a degree of similarity between the spell sequence and the other spell sequence.

12. The wand of claim 1, wherein the one or more sensors include an accelerometer, a geomagnetic sensor, a gyroscope, a microphone, and a biometric sensor, and wherein the one or more gestures include at least one of: a physical motion detected by one or more of the accelerometer, the geomagnetic sensor, or the gyroscope; a voice input to the microphone; or a biotic input to the biometric sensor such that the spell sequence is unique to the user and a spell sequence of another user based on one or more other gestures performed by the other user using the wand are unique to the other user.

13. The wand of claim 12, wherein the one or more gestures include a bodily movement and the accelerometer, the geomagnetic sensor, and the gyroscope are to generate the sensor data based on a performance of the bodily movement by the user, and generate different sensor data based on a performance of the bodily movement by another user.

14. At least one non-transitory computer readable storage medium, including instructions to cause a computing device, in response to execution of the instructions by the computing device, to:
obtain a spell sequence converted from one or more gestures wherein the one or more gestures are movements performed using a wand by a user, wherein the spell sequence is for authentication of the user based on sensor data from one or more sensors;
authenticate an identity of the user including determining, by the computing device, whether the spell sequence matches an authentication spell sequence;
when the spell sequence matches the authentication spell sequence, provide an authentication spell output, wherein the authentication spell output indicates, by activating one or more first devices of the wand or activating one or more second devices communicatively coupled with the wand, that the user is authorized to use the wand; and
when the spell sequence does not match the authentication spell sequence, provide an inactivation spell output, wherein the inactivation spell output indicates, by activating the one or more first devices of the wand or activating the one or more second devices communicatively coupled with the wand, that the user is not authorized to use the wand.

15. The at least one non-transitory computer readable storage medium of claim 14, wherein the authentication spell sequence is assigned to the user via an accounting server or the authentication spell sequence is defined by the user.

16. The at least one non-transitory computer readable storage medium of claim 15, wherein to define the authentication spell sequence, the user is to perform the one or more gestures during a registration period, wherein the registration period is to be initiated during a setup of the wand, and the instructions cause the computing device to:
obtain a defined authentication spell output and the authentication spell sequence, wherein the authentication spell sequence is based on one or more gestures performed during the registration period, and the defined authentication spell output is a desired spell output defined by the user during the registration period to be used as the authentication spell output; and
provide the authentication spell sequence and the defined authentication spell output to the accounting server.

17. The at least one non-transitory computer readable storage medium of claim 16, wherein the instructions cause the computing device to:

provide a setup-start indicator to the wand, wherein the registration period is to begin upon reception of the setup-start indicator; and provide a setup-termination indicator to the wand, wherein the registration period is to terminate upon reception of the setup-termination indicator, wherein the setup-termination indicator is to indicate one of a timer associated with the registration period has expired, a predetermined counter value of a counter associated with the registration period has been reached, or a predetermined gesture for termination of the registration period has been performed.

18. The at least one non-transitory computer readable storage medium of claim 17, wherein the instructions cause the computing device to:

before the setup-start indicator is to be provided to the wand, receive the setup-start indicator from the accounting server, or generating the setup-start indicator in response to receiving an input indicating to start the registration period; and before the setup-termination indicator is to be provided to the wand, receive the setup-termination indicator from the accounting server, or generating the setup-start indicator in response to receiving an input indicating to end the registration period.

19. The at least one non-transitory computer readable storage medium of claim 15, wherein, when the authentication spell sequence is assigned to the user, the instructions cause the computing device to:

display media content during a registration period, wherein the media content is to indicate one or more gestures to be performed to obtain the authentication spell output, wherein the registration period is to be initiated during a setup of the wand, and during the setup;

receive the authentication spell sequence, wherein the authentication spell sequence indicates that the user performed the one or more gestures for obtaining the authentication spell output; and provide the authentication spell output in response to receiving the authentication spell sequence.

20. A computer-implemented method for authenticating that a user is authorized to use a wand, the method comprising:

obtaining, by a computing device, a spell sequence converted from one or more gestures wherein the one or more gestures are movements performed using a wand by the user, wherein the spell sequence is for authentication of the user based on sensor data from one or more sensors;

authenticating an identity of the user including determining, by the computing device, whether the spell sequence matches an authentication spell sequence;

when the spell sequence matches the authentication spell sequence, providing, by the computing device, an authentication spell output, wherein the authentication spell output indicates, by activating one or more first devices of the wand or activating one or more second devices communicatively coupled with the wand, that the user is authorized to use the wand; and when the spell sequence does not match the authentication spell sequence, providing, by the computing device, an inactivation spell output, wherein the inactivation spell output indicates, by activating the one or more first devices of the wand or activating the one or more second devices communicatively coupled with the wand, that the user is not authorized to use the wand.

21. The method of claim 20, wherein determining whether the spell sequence matches the authentication spell sequence comprises:

comparing of the obtained spell sequence with a defined spell sequence for each of a plurality of spells;

determining a degree of similarity between the spell sequence and the defined spell sequence of each of the plurality of spells, wherein the degree of similarity indicates a number and order of operations of the spell sequence that matches a number and order of operations of the defined spell sequence, and selecting a spell having a greatest degree of similarity among the plurality of spells.

22. The method of claim 20, wherein authenticating the identity of the user further comprises:

determining a wand position relative to one or more auxiliary devices;

obtaining an auxiliary device identifier by extracting the auxiliary device identifier from one or more data packets of a signal broadcast by the auxiliary device; and determining whether the auxiliary device identifier indicates to authorize the user to use the wand.

23. The method of claim 20, wherein authenticating the identity of the user further comprises:

determining a wand position relative to another wand;

obtaining a spell indicator from a first signal broadcast by the other wand or a second signal broadcast by another computing device communicatively coupled with the other wand, wherein the spell indicator indicates another spell sequence wherein the other spell sequence indicates one or more gestures performed by another user of the other wand;

determining a degree of similarity between the spell sequence and the other spell sequence; and providing the authentication spell output when the degree of similarity between the spell sequence and the other spell sequence is above a predefined threshold.

24. The method of claim 20, wherein the one or more gestures include at least one of: a physical motion detected by one or more of an accelerometer, a geomagnetic sensor, or a gyroscope; a voice input from a microphone; or a biotic input from a biometric sensor such that the spell sequence is unique to the user and a spell sequence of another user based on one or more other gestures performed by the other user using the wand are unique to the other user, and the one or more gestures include a bodily movement such that the spell sequence based on a performance of the bodily movement by the user is different than another spell sequence base on a same performance of the bodily movement by another user.

25. The method of claim 20, wherein the computing device is a different device than the wand and communicatively coupled with the wand, or the computing device resides in the wand.

* * * * *

UNITED STATES PATENT AND TRADEMARK OFFICE
CERTIFICATE OF CORRECTION

| | | |
|---|---|---|
| PATENT NO. | : 9,692,756 B2 | |
| APPLICATION NO. | : 14/864572 | |
| DATED | : June 27, 2017 | |
| INVENTOR(S) | : David I. Poisner et al. | |

It is certified that error appears in the above-identified patent and that said Letters Patent is hereby corrected as shown below:

In the Claims

Column 64
Line 56, "...base on..." should read "...based on..."

Signed and Sealed this
Nineteenth Day of December, 2017

Joseph Matal
*Performing the Functions and Duties of the*
*Under Secretary of Commerce for Intellectual Property and*
*Director of the United States Patent and Trademark Office*